(12) United States Patent
Skillermark et al.

(10) Patent No.: US 10,602,565 B2
(45) Date of Patent: Mar. 24, 2020

(54) FIRST COMMUNICATION DEVICE, SECOND COMMUNICATION, AND METHODS THEREIN, FOR RESOLVING A STATE MISMATCH

(71) Applicant: Telefonaktiebolaget LM Ericsson (publ), Stockholm (SE)

(72) Inventors: Per Skillermark, Årsta (SE); Pontus Arvidson, Danderyd (SE); Bo Hagerman, Tyresö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/741,678

(22) PCT Filed: Jul. 10, 2015

(86) PCT No.: PCT/SE2015/050816
§ 371 (c)(1),
(2) Date: Jan. 3, 2018

(87) PCT Pub. No.: WO2017/010920
PCT Pub. Date: Jan. 19, 2017

(65) Prior Publication Data
US 2018/0199397 A1    Jul. 12, 2018

(51) Int. Cl.
*H04W 72/04*     (2009.01)
*H04W 76/27*     (2018.01)
(Continued)

(52) U.S. Cl.
CPC ............ *H04W 76/27* (2018.02); *H04W 76/11* (2018.02); *H04W 8/005* (2013.01); *H04W 76/10* (2018.02); *H04W 76/18* (2018.02); *H04W 84/20* (2013.01)

(58) Field of Classification Search
CPC ..... H04W 76/27; H04W 76/11; H04W 76/10; H04W 84/20; H04W 8/005
See application file for complete search history.

(56) References Cited

U.S. PATENT DOCUMENTS

| 8,504,902 B2* | 8/2013 | Shi .................. H04W 68/00 455/115.3 |
| 9,686,051 B2* | 6/2017 | DiStasi ................ H04L 1/189 |

(Continued)

FOREIGN PATENT DOCUMENTS

EP    2645807 A1    10/2013

OTHER PUBLICATIONS

3GPP TSG-RAN W2 Meeting #82; Fukuoka, Japan; Source: Research in Motion UK Limited; Title: RRC State Mismatch Problems (R2-132063)—May 20-24, 2013.
(Continued)

*Primary Examiner* — Hassan Kizou
*Assistant Examiner* — Mahbubul Bar Chowdhury
(74) *Attorney, Agent, or Firm* — Patent Portfolio Builders, PLLC

(57) ABSTRACT

Method performed by a first communication device (511) for performing one or more actions to resolve a state mismatch between the first communication device (511) and a second communication device (512) operating in a communications network (500). The first communication device (511) searches (601, 704) for one or more transmissions from the second communication device (512) that are indicative of a state mismatch between the first communication device (511) and the second communication device (512). Upon detection of the one or more transmissions, the first communication device (511) performs (602, 705) one or more actions to resolve the state mismatch. The performing (602, 705) of the one or more actions is according to one of: a)
(Continued)

current state of the second communication device (512) and b) a transition to a state different from a current state of the first communication device (511).

23 Claims, 12 Drawing Sheets

(51) Int. Cl.
  *H04W 76/11*   (2018.01)
  *H04W 76/10*   (2018.01)
  *H04W 8/00*    (2009.01)
  *H04W 84/20*   (2009.01)
  *H04W 76/18*   (2018.01)

(56) References Cited

U.S. PATENT DOCUMENTS

| | | | | |
|---|---|---|---|---|
| 2011/0021142 | A1* | 1/2011 | Desai | H04W 8/005 455/41.2 |
| 2013/0215834 | A1 | 8/2013 | Deivasigamani et al. | |
| 2013/0331057 | A1* | 12/2013 | Kodali | H04W 76/18 455/404.1 |
| 2013/0346207 | A1* | 12/2013 | Qi | G06Q 30/0267 705/14.64 |
| 2014/0378058 | A1* | 12/2014 | Decuir | H04W 4/80 455/41.2 |
| 2015/0085727 | A1* | 3/2015 | Baglin | H04W 52/0225 370/311 |
| 2015/0382171 | A1* | 12/2015 | Roy | H04W 48/16 370/329 |
| 2018/0098338 | A1* | 4/2018 | Choi | H04L 29/08 |

OTHER PUBLICATIONS

PCT International Search Report for International application No. PCT/SE2015/050816—dated Apr. 1, 2016.

PCT Written Opinion of the International Searching Authority for International application No. PCT/SE2015/050816—dated Apr. 1, 2016.

QUALCOMM Incorporated., "LTE UE RRC State Mismatch Handling," 3rd Generation Partnership Project (3GPP); Jan. 28, 2013; Malta.

Extended European Search Report issued in Application No. 15898411.2; dated Feb. 14, 2019; 8 Pages.

* cited by examiner

FIRST COMMUNICATION DEVICE, SECOND COMMUNICATION, AND METHODS THEREIN, FOR RESOLVING A STATE MISMATCH

This nonprovisional application is a U.S. National Stage Filing under 35 U.S.C. § 371 of International Patent Application Serial No. PCT/SE2015/050816 filed Jul. 10, 2015, and entitled "First Communication Device, Second Communication, And Methods Therein, For Resolving A State Mismatch."

TECHNICAL FIELD

The present disclosure relates generally to a first communication device and methods therein for performing one or more actions to resolve a state mismatch between the first communication device and the second communication device. The present disclosure also relates generally to a second communication device and methods therein for sending an advertisement message to the first communication device. The present disclosure further relates generally to computer programs and computer-readable storage mediums, having stored thereon the computer programs to carry out these methods.

BACKGROUND

State machines may often be used to describe and define the operation of communication systems. A communication device state machine is a logical model of the operations of the device. A state machine may comprise a finite number of states and may define the allowed state transitions. A state may be understood herein as a part of a series, e.g., a cycle, of actions a communication device operating according to the state machine goes through, and it may correspond to a particular number and/or order of actions. The actions of the series or cycle may be understood to refer to e.g., computing procedures, or physical procedures such as transmitting or receiving messages or signals from another communication devices operating according to the state machine. The communication device may only be in one of the states at a time. The device may change state from one state to another when some predetermined conditions are fulfilled or certain events triggered. Such a change of states is referred to as a state transition. A state machine may be defined by its states and the triggering conditions for state transitions. The actions that a device in the system may take depend on its current state and a device may typically only change state given that some pre-determined conditions are met, not all actions may be allowed in all states. The knowledge of the state of a device may provide its communicating peer with information regarding what may be expected of this device and such predictable device behaviour may be used to run and optimize the operation of the system.

Among the triggering conditions for state transitions may be messages transmitted between the communication peers. For example, for two devices in a first state of a configured series of states, a specific first message from a first one of the devices may trigger the peer, second, device to enter a second state. The second device may then send a second message to the first device, and trigger the first device to also enter the second state.

A communication error between the peers, e.g., one of the peers not receiving the specific message from the first device, may result in a state mismatch. A state mismatch may be understood herein as a situation wherein the two devices communicating, device 1 and device 2 are not associated with the same state. To be associated with the same state refers herein to have the same state, or to be in the expected path to transition to the state of the other device, according to the communication exchanged between the devices. In other words, a state mismatch occurs when the device 1 is in a state that is not consistent with the state of the device 2.

If a state mismatch happens, communication between the peers may be delayed. Moreover, peer devices may not be able to communicate properly according to the sequence of expected actions, and unnecessary transmissions may occur between the peers that are set to fail, resulting in wasted energy and resources, as well as causing interference in the network. Moreover, the devices may be unable to communicate with other devices during the time of the state mismatch. The state mismatch hence degrades the performance not only of the link between the devices involved in the state mismatch, but for the entire network.

Currently, existing methods to approach the state mismatch problem are based on the use of timeouts. For example, if an expected response from a peer device is not received within some pre-defined time, a time out will happen, and the mismatch may be resolved. However, the resolution of state mismatches based on a time out is slow and inefficient.

An example of a communication system state machine is the LTE UE Radio Resource Control (RRC state) machine, which comprises two states: idle and connected. A communication device, e.g., a UE, operating according to the LTE UE RRC state machine may move from idle to connected state once a connection is established and may move from connected to idle state when the connection is released. The LTE UE RRC state machine is defined in 3GPP TS 36.331 "Evolved Universal Terrestrial Radio Access (E-UTRA); Radio Resource Control (RRC); Protocol specification", v12.5.0, (2015-03), Another communication system state machine is the Bluetooth Low Energy (BLE) link layer state machine, depicted in the schematic diagram of FIG. 1. The BLE state machine may comprise five states, referred to as standby, advertising, scanning, initiating, and connection state. The directed arrows in FIG. 1 define the permitted state transitions.

BLE is a low-energy, low-cost radio communication technology that may be used, e.g., to collect information from sensors in an area. One possible setup is to have one Bluetooth low energy central device collecting information from several peripheral devices. In such a case, the central device acts as a master and is connected to several peripheral devices which, once in a connection with the central device, act as slaves. To support a large number of peripheral devices, it is in many cases advantageous if the master is able to maintain several simultaneous connections, each connection being associated with a different peripheral device. A device in initiating state is a central device, whereas a device in advertising state is a peripheral device. When a connection is created, the central device, in initiating state, may take the role as a master in the connection and the peripheral device, in advertising state may take the role as slave in the connection.

The Industrial, Scientific and Medical (ISM) radio bands are radio bands reserved internationally for the use of Radio Frequency (RF) energy for industrial, scientific and medical purposes. In recent years the fastest-growing uses of these bands have been for short-range, low power communications systems. Bluetooth devices may use frequencies allocated to ISM, although this low power emitter is not considered ISM.

BLE is defined to operate in the 2.4 GigaHertz (GHz) ISM band, and uses approximately 80 MegaHertz (MHz) of the spectrum. In BLE, there are 40 channels or frequencies of 1 MHz; the frequencies being separated by 2 MHz. Out of these 40 frequencies, three are advertising frequencies, link layer frequencies 37, 38, and 39, that may be used, e.g., to initiate a connection between a master node and a slave device, and 37 are data frequencies, link layer frequencies 0-36, which may be used for payload exchange between the master node and the slave device. FIG. 2 is a schematic diagram depicting the BLE frequency map, with the respective link layer frequency numbers. The first physical channel, which corresponds to the link layer frequency 37, resides at 2402 MHz, whereas the last physical channel, i.e., link layer frequency 39, resides at 2480 MHz. A BLE physical channel has a bandwidth of 1 MHz and may use GFSK modulation.

A communication device operating according to the BLE state machine is known as a BLE device. A BLE device in advertising state is known as an advertiser, a device in scanning state, which may also be referred to herein as searching state, is known as a scanner, and a device in initiating state is known as an initiator. In connection state, the device may be referred to as either master or slave, depending on if it enters connection state from the initiating state or the advertising state, respectively. In standby state, the device is idle and no packets may be transmitted or received.

In BLE, one common approach to set up a connection may be that an advertiser transmits a directed advertisement message (ADV_DIRECT_IND), i.e., an advertisement message destined to a specific peer device, and asks this device to set up a connection. Alternatively, an undirected advertisement message (ADV_IND) may be transmitted. In this case, any device may answer. If the peer device is in initiating state and is able to correctly receive the advertising message, it may respond with a connection request (CONNECT_REQ) message, which includes the connection setup parameters. The data transfer in between the two devices then may start by a packet transmission from the master to the slave. Transmission of the advertisement message may be in an advertisement channel, that is, in a frequency assigned for transmission of advertisement messages, as depicted in FIG. 2. Transmission of the data may be in a data channel, that is, in a frequency in the data channel, as depicted in FIG. 2.

An example of a successful BLE connection setup procedure is depicted in FIG. 3. The procedure depicted in FIG. 3 assumes that the advertiser transmits a directed advertisement message, however, the description is valid also if an undirected advertisement message is transmitted. It is assumed that there are two devices, referred to as device 1 and device 2. Device 2, the advertiser, is in advertising state with the ambition to setup a connection with device 1, the initiator, which is in initiating state. First, the advertiser transmits a direct advertisement message at time t0. The initiator receives this message and responds with a connection request message at time t1. According to the BLE link layer specification, the initiating device may change to connection state, taking the master role, once the connection request message has been transmitted, i.e., at time t1 in this example. Similarly, the device in advertising state may change to connection state, taking the slave role, once the connection request message has been received. In this example, neglecting processing time in the devices and the signal propagation time, the advertiser changes to connection state at time t1, i.e., at the same time as the initiator changes to connection state. The master then initiates the data transmission by sending a first data packet to the slave at time t2. This first transmission is referred to as the anchor point of the connection. The slave responds to this message at time t3. Following BLE terminology, the connection is said to be created once the connection request message has been transmitted and received by the master and slave, respectively. The connection is said to be established once a data packet from the peer has been correctly received. In this example, both devices hence consider the connection to be created at time t1. Device 1 considers the connection to be established at time t3 whereas device 2 considered the connection to be established at time t2.

In the example described above no packet errors occur, the peer devices are always in consistent states and the setup procedure runs smoothly. In practice, however, packet errors or other disturbances sometimes occur. For example, it may happen that the advertiser is not able to correctly decode the connection request message. This is illustrated in FIG. 4. FIG. 4 is a schematic diagram illustrating an example of an unsuccessful BLE connection setup.

The protocol does not include any explicit acknowledgement of the connection request message and such a decoding failure is hence unknown to the initiator, which may assume that the advertiser has received the connection request message and entered connection state at time t1. The advertiser, however, does not receive the connection request message and stays in advertising state. The result is a state mismatch. In relation to the example of FIG. 4, Device 2, in advertising state, will continue to act according to the protocol rules defined for the advertising state, which likely means it will make another try to transmit the advertisement message after some time. Device 1, on the other hand, is in connection state and hence transmits the data packet at time t4. This transmission is, however, destined to fail as the peer device, device 2, is not expecting any packet transmission and does not even try to receive this packet. In BLE, the state mismatch is solved by means of a timeout. In the example of FIG. 4, Device 1 will re-transmit the data packet several times, however, if no response from device 2 is received within some pre-defined time it will cause a time-out in existing methods. The time-out triggers a state change such that device 1 moves from connection state back to initiating state, via the standby state, and the state mismatch is resolved. In BLE, a connection that is created but not established may be considered lost after a time that corresponds to six connection intervals (connInterval). The length of the connection interval may be configurable and may take values in between 7.5 milliseconds (ms) and 4 seconds (s). The state mismatch is hence resolved after a time between 45 ms or 24 s.

A similar problem may appear when the connection should be terminated. A device that would like to terminate a connection may send a link layer termination message, which may be acknowledged by the peer. The device sending the acknowledgement of the termination message may go to standby state once the acknowledgement has been transmitted, while the device sending the termination message may go to standby state once the acknowledgement is received. If the acknowledgement is not received, however, there is one device in connection state and one device in standby state, i.e., there is a state mismatch. The device in connection state may continue to transmit or listen, depending on whether it is a master or slave, for packets on the data channel until the connection times out. In this case, for established connections, the timeout may take a value in between 100 ms and 32 s. It may be also specified that the timeout value may be at least (1+connSlaveLatency)*connInterval*2, where connSlaveLatency is the slave latency.

The existing state mismatch resolution scheme may solve the state mismatch; however, the resolution is slow and inefficient. If the mismatch occurs during the connection setup phase, the setup, and hence the data transfer, is significantly delayed. If it happens during connection termination, the device stays an unnecessarily long time in connection state. Another consequence of the state mismatch is further that packets that with full certainty are destined to fail are still transmitted, wasting both energy and causing unnecessary interference.

Moreover, some BLE devices may only support a single connection, and hence, if the master believes it is in connection with another device, it may not have the capability to serve any other device during the time of the state mismatch. The state mismatch hence degrades the performance not only of the link between the devices involved in the state mismatch but for the entire network.

The state mismatch problem is general and applies to all communication systems using state machines. If there is a state mismatch, the performance of the network may be degraded.

SUMMARY

It is an object of embodiments herein to improve the performance in a wireless communications network by improving the procedure to resolve a state mismatch between communication devices.

According to a first aspect of embodiments herein, the object is achieved by a method performed by a first communication device for performing one or more actions. The one or more actions are to resolve a state mismatch between the first communication device and a second communication device. The first communication device and the second communication device operate in a communications network. The first communication device searches for one or more transmissions from the second communication device. The one or more transmissions are indicative of a state mismatch between the first communication device and the second communication device. Upon detection of the one or more transmissions, the first communication device performs one or more actions to resolve the state mismatch. The performing of the one or more actions is according to one of: a) a current state of the second communication device, and b) a transition to a state different from a current state of the first communication device.

According to a second aspect of embodiments herein, the object is achieved by a method performed by the second communication device. The method is for sending an advertisement message to a first communication device. The first communication device and the second communication device operate in the communications network. The second communication device obtains a timing information for advertising transmissions. The timing information comprises a time of transmission of one or more transmissions from the second communication device on a communication medium between the first communication device and the second communication device. The one or more transmissions are one or more advertisement messages. The second communication device sends an advertisement message to the first communication device. The message comprises the obtained timing information for advertising transmissions. The advertisement message enables the first communication device to determine a time for searching for the one or more transmissions from the second communication device. The one or more transmissions are indicative of a state mismatch between the first communication device and the second communication device.

According to a third aspect of embodiments herein, the object is achieved by a first communication device configured to perform the one or more actions to resolve the state mismatch between the first communication device and the second communication device. The first communication device and the second communication device are further configured to operate in the communications network. The first communication device is further configured to search for the one or more transmissions from the second communication device that are indicative of the state mismatch between the first communication device and the second communication device. Upon detection of the one or more transmissions, the first communication device performs the one or more actions to resolve the state mismatch. The performing of the one or more actions is configured to be according to one of: a) a current state of the second communication device and b) a transition to a state different from a current state of the first communication device.

According to a fourth aspect of embodiments herein, the object is achieved by a second communication device configured to send the advertisement message to the first communication device. The first communication device and the second communication device are configured to operate in the communications network. The first communication device is further configured to obtain a timing information for advertising transmissions. The timing information comprises a time of transmission of the one or more transmissions from the second communication device on a communication medium between the first communication device and the second communication device. The one or more transmissions are one or more advertisement messages. The second communication device sends an advertisement message to the first communication device. The message comprises the obtained timing information for advertising transmissions. The advertisement message is configured to enable the first communication device to determine a time for searching for the one or more transmissions from the second communication device. The one or more transmissions are indicative of the state mismatch between the first communication device and the second communication device.

According to a fifth aspect of embodiments herein, the object is achieved by a computer program, comprising instructions which, when executed on at least one processor, cause the at least one processor to carry out the method performed by the first communication device.

According to a sixth aspect of embodiments herein, the object is achieved by a computer-readable storage medium, having stored thereon a computer program, comprising instructions which, when executed on at least one processor, cause the at least one processor to carry out the method performed by the first communication device.

According to a seventh aspect of embodiments herein, the object is achieved by a computer program, comprising instructions which, when executed on at least one processor, cause the at least one processor to carry out the method performed by the second communication device.

According to an eighth aspect of embodiments herein, the object is achieved by a computer-readable storage medium, having stored thereon a computer program, comprising instructions which, when executed on at least one processor, cause the at least one processor to carry out the method performed by the second communication device.

By searching for one or more transmissions from the second communication device that are indicative of a state mismatch, the first communication device may detect the state mismatch and resolve it by performing the one or more actions, with a resolution time that is significantly lower than existing methods based on a timeout. Thus, the performance of the link between the first communication device and the second communication device in the state mismatch is improved, as well as the performance of the entire communications network, as latency and interference are reduced while capacity is increased.

BRIEF DESCRIPTION OF THE DRAWINGS

Examples of embodiments herein are described in more detail with reference to the accompanying drawings, in which.

DETAILED DESCRIPTION

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Note that although terminology from BLE has been used in this disclosure to exemplify the embodiments herein, this should not be seen as limiting the scope of the embodiments herein to only the aforementioned system. Other wireless systems, including Bluetooth, 802.15.4 derivatives such as Zigbee, WirelessHART, and ISA100.11a, also Z-wave and 802.11, and 802.11ah, 3rd Generation Partnership Project (3GPP) Long-Term Evolution (LTE), Wideband Code Division Multiple Access (WCDMA), Worldwide Interoperability for Microwave Access (WiMax), Ultra Mobile Broadband (UMB) and Global System for Mobile communications (GSM), may also benefit from exploiting the ideas covered within this disclosure. Therefore BLE terminology such as e.g., connection state, or advertisement state, should be considered non-limiting.

Figure 5:
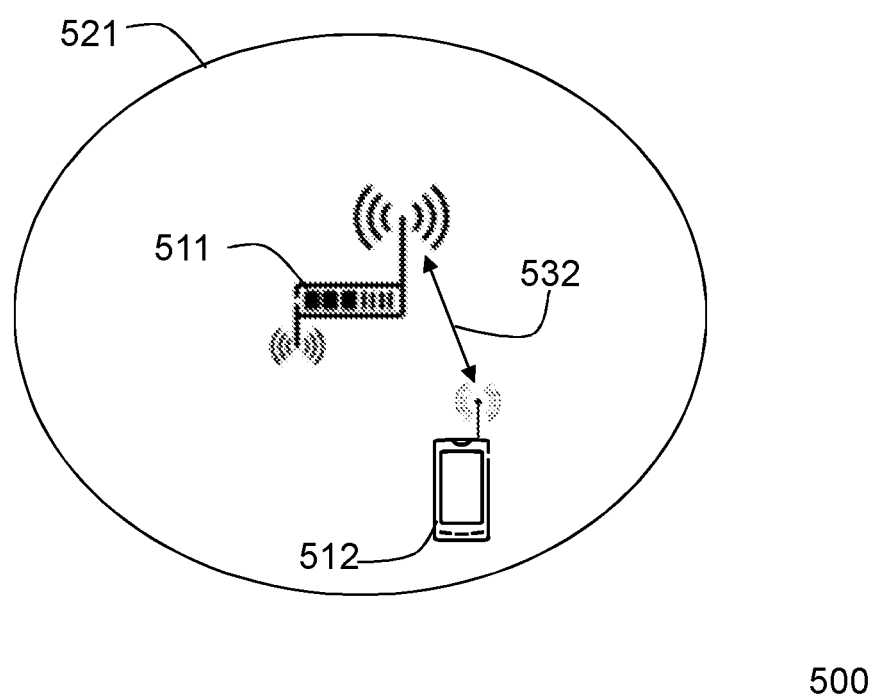
FIG. 5 is a schematic diagram illustrating embodiments of a communications network, according to some embodiments.

FIG. 5 depicts a communications network 500 in which embodiments herein may be implemented. The communications network 500 may for example be a short-range technology network operating e.g., in unlicensed band, such as a Bluetooth, Bluetooth Low Energy, 802.15.4 derivatives such as Zigbee, WirelessHART, and ISA100.11a, also Z-wave and 802.11, and 802.11 ah. The communications network 500 may also be a network such as an LTE, e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3GPP cellular network, WiFi network, WiMax, 5G system or any cellular network or system. The communications network 500 may also be referred to as a wireless communications network, wireless communications system, cellular radio system or cellular network, based on the technology used.

A number of communication devices are located in the communications network 500. In the example scenario of FIG. 5, only two communication devices are shown: a first communication device 511, and a second communication device 512.

Each of the first communication device 511, and the second communication device 512 operate according to a state machine, as described above, and the first communication device 511 and the second communication device 512 are communication peers. In some embodiments, the first communication device 511 is a master device or a central device, and the second communication device 512 is a slave device or a peripheral device. In other embodiments, the first communication device 511 is a slave device, and the second communication device 512 is a master device. Examples communication devices operating according to a state machine are UEs operating according to an LTE UE RRC state machine, and a central device operating according to a BLE link layer state machine. A communication device operating according to a BLE link layer state machine may also be referred to herein as a BLE device. As communication devices operating according to a state machine, each of the first communication device 511, and the second communication device 512 may be a wireless communication device such as an Access Point (AP) or access node, a station (STA), a UE, which is also known as e.g. mobile terminal, wireless terminal and/or mobile station, a mobile telephone, cellular telephone, or laptop with wireless capability, just to mention some further examples. The name of each of the first communication device 511, and the second communication device 512 will depend on the technology used. Each of the first communication device 511, and the second communication device 512 in the present context may be, for example, portable, pocket-storable, hand-held, computer-comprised, or vehicle-mounted mobile devices, enabled to communicate voice and/or data, via a RAN or the short range technology, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device, modems, or any other radio network unit capable of communicating over a radio link in a communications system according to a state machine. Each of the first communication device 511, and the second communication device 512 is wireless, i.e., it is enabled to communicate wirelessly in the communication network 500. The communication may be performed e.g., between two devices, between a device and a regular telephone and/or between a device and a server, depending on the technology used.

Any of the first communication device 511 and the second communication device 512 may be, in some embodiments, a short-range radio gateway, that is, a node utilizing non-cellular radio technology such as a BLE Access Point. The short-range radio gateway may be self-standing, or it may also be, in some embodiments, comprised in a UE. Any of the first communication device 511 and the second communication device 512 may be a multi-carrier/multi-radio node, and it may support more than one technology, e.g., IEEE 802.11ah, BLE etc. . . . In the non-limiting example of FIG. 5, the first communication device 511 is a BLE device, and the second communication device 512 is a BLE device. The first communication device 511, in some examples, may serve a geographical area 521, to provide radio coverage, as in the examples wherein the first communication device 511 is a BLE AP. In cellular technologies, the geographical are 521 may be called a cell.

In examples wherein the communications network 500 is a cellular network, each cell may be covered by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations, based on transmission power and thereby also cell size, may be of different classes such as e.g. macro eNodeB, home eNodeB or pico base station. One AP or base station may serve one or several geographical areas. Further, each base station may support one or several communication technologies. The base stations may communicate over the air interface operating on radio frequencies with the terminals within range of the base stations.

Typically, the communications network 500 may comprise more geographical areas similar to the geographical area 521, covered by their respective node providing radio coverage. This is not depicted in FIG. 5 for the sake of simplicity.

The first communication device 511 may communicate with the second communication device 512 over a link 531, which may be a radio link. In the examples wherein the communications network 500 is short-range technology network, such as BLE, the link 531 may be in unlicensed spectrum. In the examples wherein the communications network 500 is a cellular technology network, such as LTE, the link 531 may be in licensed spectrum.

In examples wherein the communications network 500 is short-range technology network, such as BLE, one of the first communication device 511 and the second communication device 512 may be a BLE device, and the other may be a BLE peripheral device. In examples wherein the communications network 500 is a cellular technology network, such as LTE, one of the first communication device 511 and the second communication device 512 may be a Home eNode B, femto Base Station, pico base station or base station, and the other may be a UE.

The usage of the nomenclature first and second communication device is arbitrary and is only used to distinguish between the references to the communication devices, according to an order, which may be an order of description herein.

In other examples than those depicted in FIG. 5, any of the first communication device 511 and the second communication device 512 may serve receiving nodes with serving beams.

Embodiments herein address the foregoing problems of existing methods by providing a method whereby the first communication device 511 may employ a state mismatch detection mechanism to discover the state mismatch, which is not based on a timeout. Once the mismatch is detected, the first communication device 511 may autonomously take action to solve it.

Therefore, embodiments herein may be understood to relate to a state mismatch detection and resolution.

Figure 6:
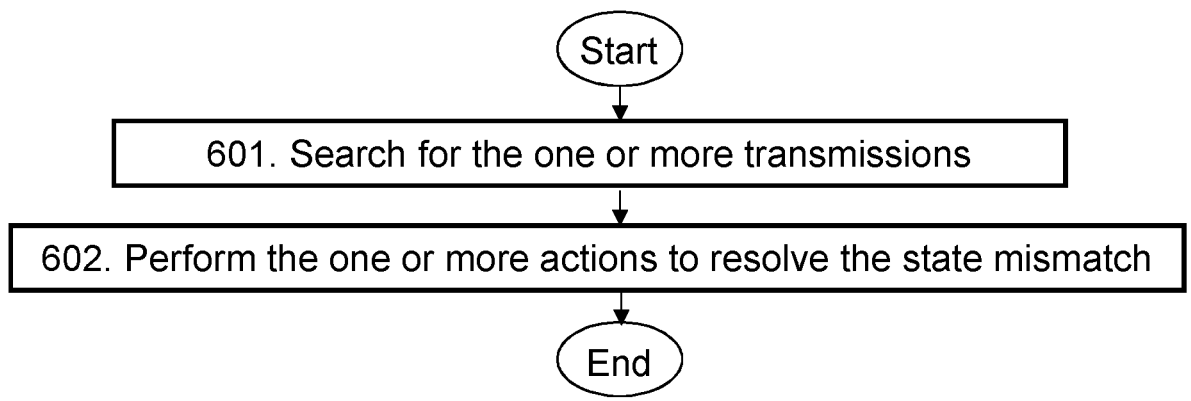
FIG. 6 is a schematic diagram illustrating embodiments of a method in a first communication device, according to some embodiments.
Figure 7:
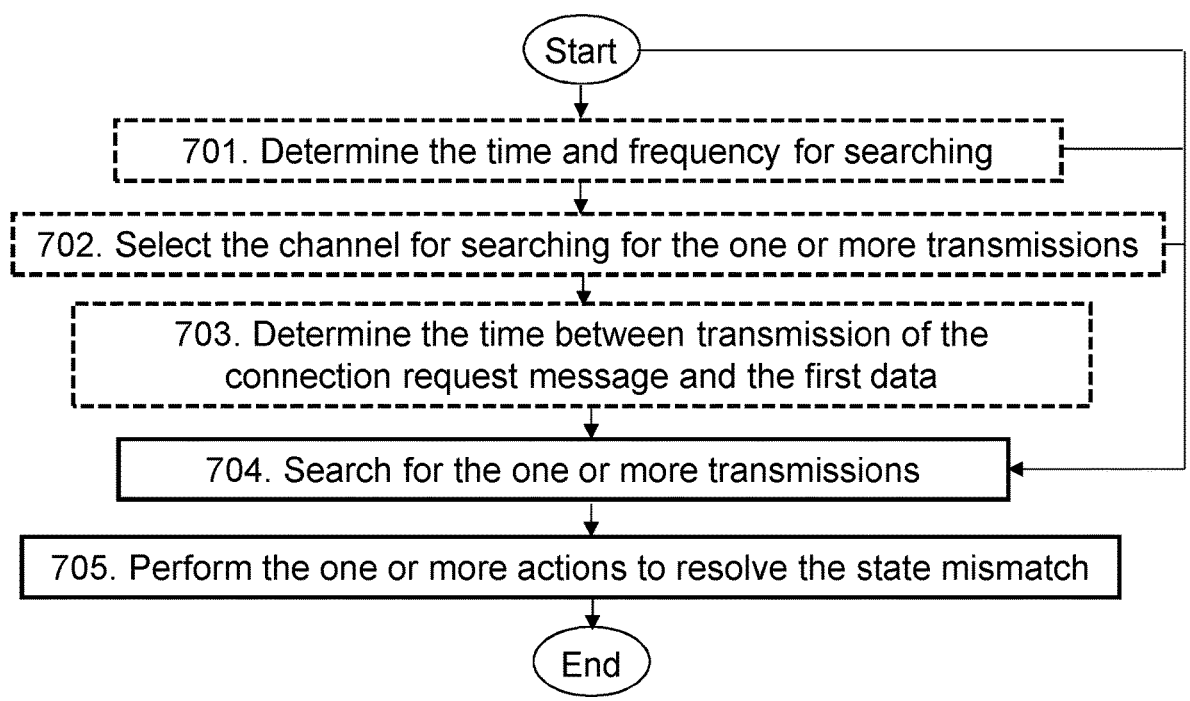
FIG. 7 is a schematic diagram illustrating embodiments of a method in a first communication device, according to some embodiments.

Embodiments of a method performed by the first communication device 511 for performing one or more actions to resolve a state mismatch between the first communication device 511 and the second communication device 512, will now be described with reference to the flowchart depicted depicted in FIG. 6 and FIG. 7. The first communication device 511 and the second communication device 512 are operating in the communications network 500. FIG. 6 depicts a flowchart of the actions that are performed by the first communication device 511 in embodiments herein.

Figure 1:
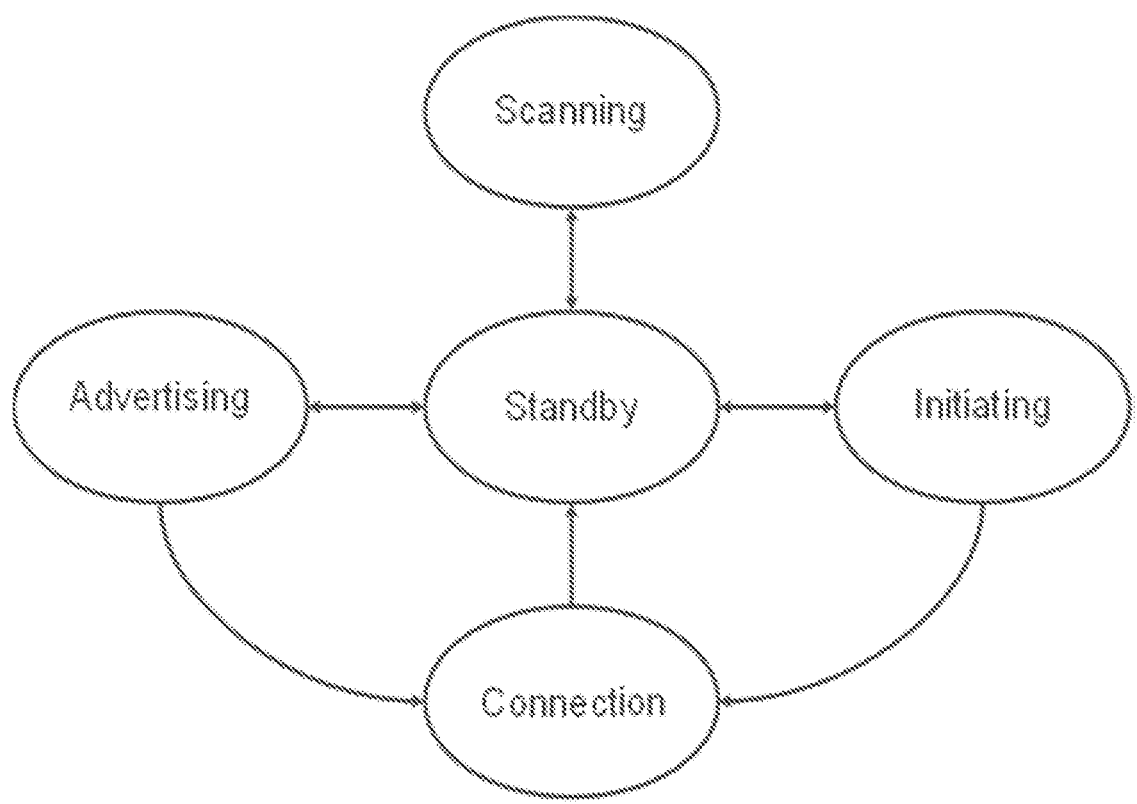
FIG. 1 is a schematic diagram illustrating an example of a BLE link layer state machine.
Figure 3:
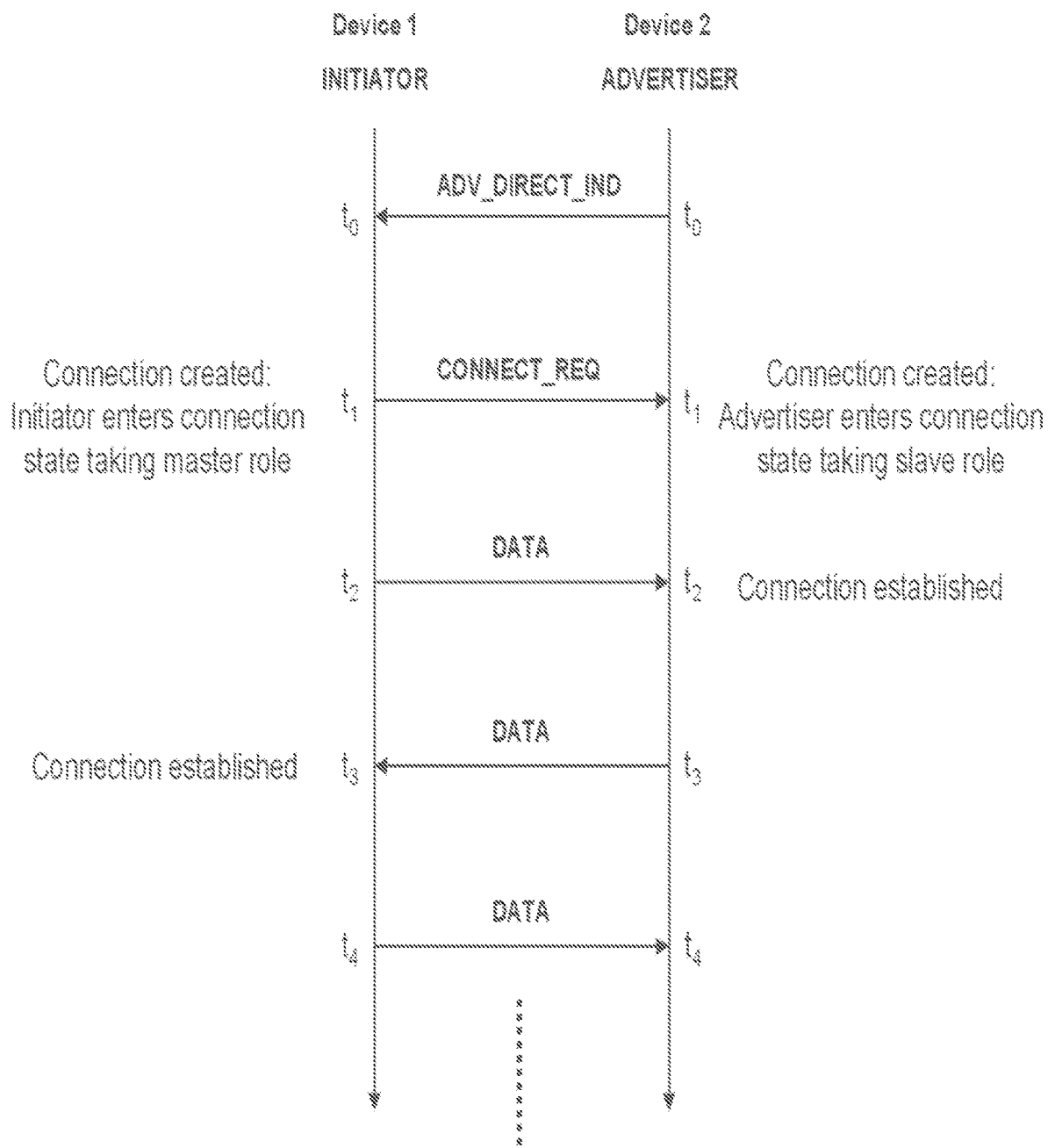
FIG. 3 is a schematic diagram illustrating an example of a successful BLE connection setup.
Figure 4:
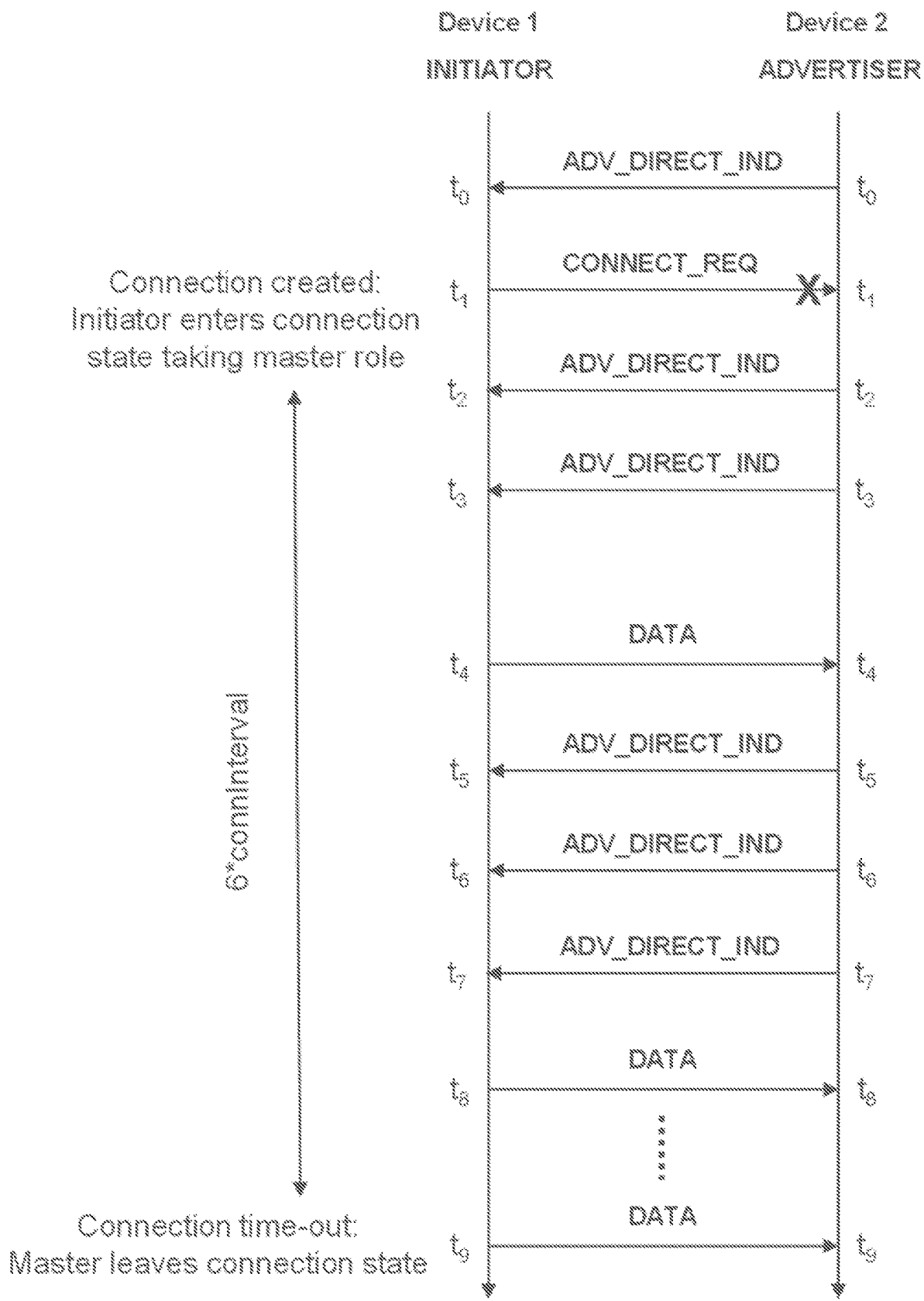
FIG. 4 is a schematic diagram illustrating an example of an unsuccessful BLE connection setup.

In relation to the actions described below, it may be first noted that, as communication devices operating according to a state machine, each of the first communication device 511 and the second communication device 512, at any given time, may be in a state or in a transition to a state, based on the particular series or cycle of states and transitions of the first communication device 511 and the second communication device 512, that is, based on a configuration of these devices. This has been illustrated with the examples of FIGS. 1 and 3-4. As described earlier in relation to FIGS. 1 and 3-4, each of these states or transitions may be associated with a particular sequence of actions of each of the first communication device 511 and the second communication device 512. The actions in the sequence of actions may be e.g., sending a connection request, sending a data packet, sending an advertisement message, etc. . . . This sequence of actions may allow the first communication device 511 to assume a state of the second communication device 512, and consequently assume the actions that the second communication device 512 is expected to perform within a given time period, according to this e.g., configured sequence. For example, after having sent a connection request to the second communication device 512, the first communication device 511 may not expect to receive further advertisement messages from the second communication device 512.

Action 601

Figure 2:
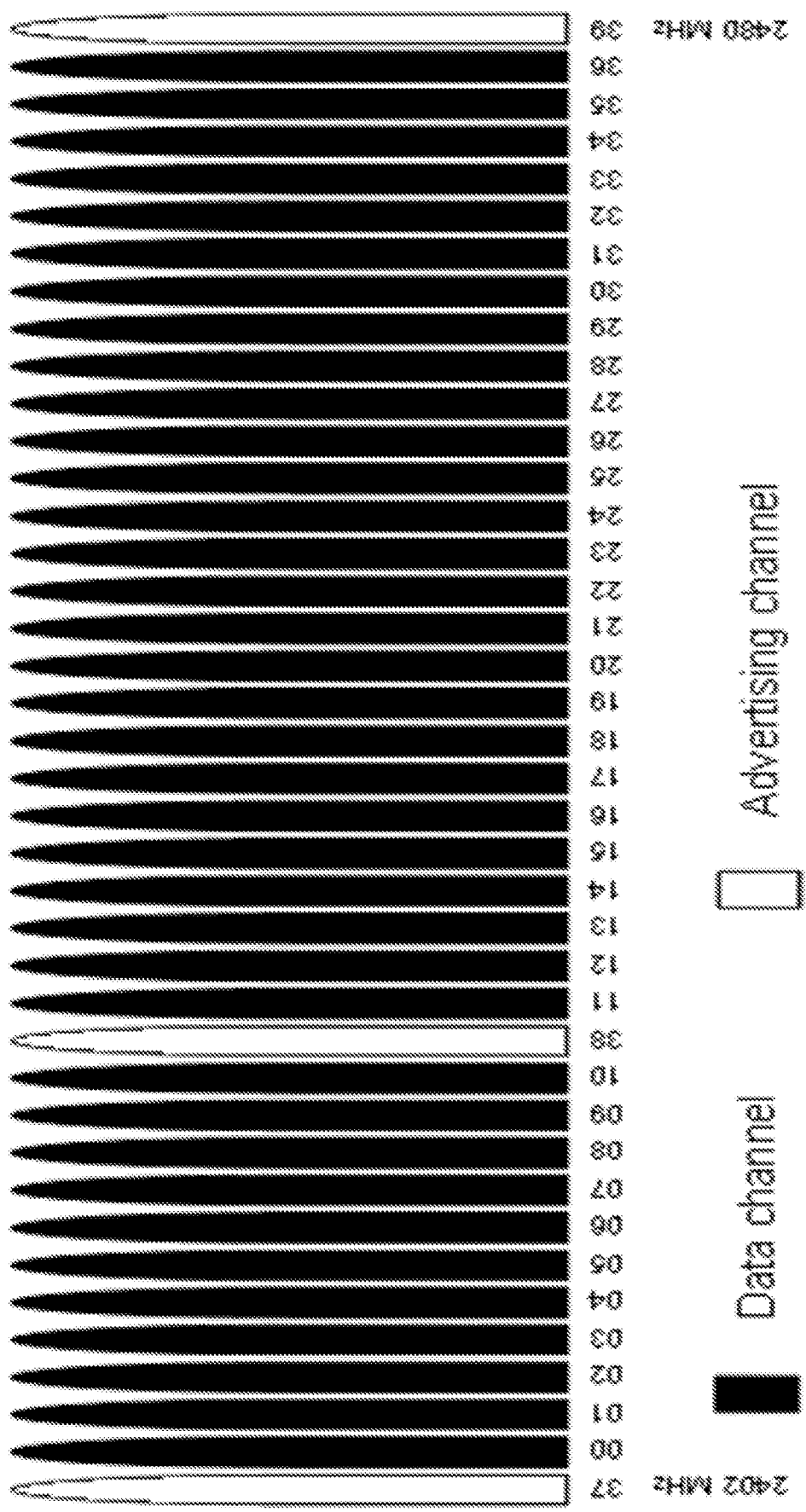

In order to detect a state mismatch between the first communication device 511 and the second communication device 512, in this action, the first communication device 511 searches for one or more transmissions from the second communication device 512 that are indicative of a state mismatch between the first communication device 511 and the second communication device 512. Searching for the one or more transmissions may also be referred to herein as scanning, actively monitoring or initiating a search for the one or more transmissions. The searching for the one or more transmissions is understood to be performed in a communication medium between the first communication device 511 and the second communication device 512. The communication medium may be the air. The communication over the communication medium may make use of radio waves, transmitted over predefined radio frequencies or channels, as illustrated in FIG. 2 for BLE. The one or more transmissions may therefore be radio transmissions.

That the one or more transmissions from the second communication device 512 are indicative of a state mismatch between the first communication device 511 and the second communication device 512 may, therefore, be understood herein as that the one or more transmissions are inconsistent with an expected state of the second communication device 512. Considering that the first communication device 511 and the second communication device 512 may have been in a previous first state in the sequence of states or transitions, the expected state may be also referred to herein as a second state, or acting according to a transition to the second state. Thus, through Action 601, the state mismatch discovery may be achieved by the first communication device 511 detecting activity from the second communication device 512, that is, the peer device that is inconsistent with the assumed state of the second communication device 512. The one or more transmissions from the second communication device 512 may be considered inconsistent with the assumed state of the second communication device 512 because they occur at a time period and/or frequency when they should not be occurring, if the sequence of states and transitions in the communication between the first communication device 511 and the second communication device 512 was successful. It will be understood that the particular sequence of states and transitions will depend on the particular configuration of the first communication device 511 and the second communication device 512. That is, it will be different for first communication device 511 and the second communication device 512 as e.g., devices operating according to a BLE link layer state machine, than as e.g., UEs operating according to an LTE UE RRC state machine.

Expressing the above differently, the first communication device 511 may search for the one or more transmissions from the second communication device 512 based on the state or transition the communication between the first communication device 511 and second communication device 512 is at.

For example in BLE, during connection setup, the first communication device 511, as master, may continue to scan the advertising frequencies after the transmission of the connection request message, and if an advertising message from the second communication device 512 is received, the first communication device 511 may conclude that the second communication device 512 has not moved to connection state, but stayed in the advertising state.

During connection termination, in e.g., BLE, given that it is the second communication device 512, as master, that may transmit the connection termination message, the first communication device 511, as slave, may continue to scan for transmissions from the second communication device 512 on the data frequencies for some time after responding to the termination message from the second communication device 512.

According to the foregoing, in some embodiments, and according to sequence of actions previously mentioned, prior to the searching of Action 601, the first communication device 511 may have transmitted a message to the second communication device 512. The message may be associated with a second state in the first communication device 511 and a second state in the second communication device 512.

The fact that the message may be associated with the second state in the first communication device 511 and the second state in the second communication device 512 may be understood as that at least one of the first communication device 511 and the second communication device 512 is transitioning to the second state from the first state. The first state in the mentioned sequence of actions is understood as an earlier state to the second state. For example in BLE, during connection setup, the first communication device 511 may have transmitted a connection request message to the second communication device 512. The connection request message is associated with the transition to the connection state in the first communication device 511, because it is followed by the transition to the connection state in the first communication device 511. The connection request message is also associated with the transition to the connection state in the second communication device 512 because it is expected to cause the transition of the second communication device 512, if received successfully by the second communication device 512.

In other embodiments, the fact that the message may be associated with the second state in the first communication device 511 and the second state in the second communication device 512 may be understood, as that the first communication device 511 is expected to transition to the second state. For example in BLE, during connection termination, the first communication device 511 may have transmitted an acknowledgement of a termination message to the second communication device 512. The acknowledgement message of the termination message may not cause the immediate transition to the standby state, but it may be expected to cause transition to the standby state in the first communication device 511, and in the second communication device 512, if received successfully.

Yet in other embodiments, the fact that the message may be associated with the second state in the first communication device 511 and the second state in the second communication device 512 may be understood as that the first communication device 511 is in the second state. For example in BLE, during connection termination, the first communication device 511 may have transmitted an acknowledgement of a termination message to the second communication device 512. The acknowledgement message of the termination message may have caused the immediate transition of the first communication device 511 to the standby state, and also of the second communication device 512, if received successfully.

This Action 601 will be further described below in relation to the examples of FIGS. 8 and 9.

Action 602

Upon detection of the one or more transmissions described in Action 601, in this action 602, the first communication device 511 performs one or more actions to resolve the state mismatch. The performing of the one or more actions is done according to one of: a) a current state of the second communication device 512, and b) a transition to a state different from a current state of the first communication device 511, as described below.

Upon detection may be understood as referring to within a certain time period after detection, e.g., within 10 microseconds (μs). In some examples, wherein the first communication device 511 is a BLE, another example of upon detection may be within 150 μs after the end of a received packet.

The current state is understood herein to refer to the state of the device in question, in the present time.

Action 602 is described below using BLE examples.

a) Performing of the One or More Actions is Done According to the Current State of the Second Communication Device 512

Taking BLE as an example, when the mismatch happens during connection termination, the first communication device 511, as slave, may resolve the state mismatch. Upon the first communication device 511 detecting a data transmission from the second communication device 512 after having responded to the termination message from the second communication device 512, the first communication device 511 may resolve the state mismatch by responding to the data transmission from the second communication device 512, as master. That is, the first communication device 511 may resolve the state mismatch by acting according to the current state of the second communication device 512, which in this case is the connection state.

In the embodiments wherein prior to the searching, the first communication device 511 has transmitted a message to the second communication device 512, the current state of the second communication device 512 is an earlier state to the second state. For example, the earlier state is a connection state and the second state is a standby state. In another example, the earlier state is a connected state and the second state is an idle state.

b) Performing of the One or More Actions is Done According to the Transition to a State Different From a Current State of the First Communication Device 511

Taking BLE as an example, when the mismatch happens during the connection setup phase, it may be the first communication device 511 as master that may resolve it, and the first communication device 511 may do so by terminating the connection and moving back from the connection state to the initiating state, via the standby state. In this scenario, the current state of the first communication device 511 is the connection state. The first communication device 511 may then transition to the standby state, which is different from the connection state, by terminating the connection with the second communication device 512. In some particular examples, as a response to an advertising message from the second communication device 512, the first communication device 511 may again try to create the connection with the second communication device 512 by transmitting another connection request message to the second communication device 512.

In the embodiments wherein prior to the searching, the first communication device 511 has transmitted a message to the second communication device 512, the state different from the current state of the first communication device 511 may be a third state, wherein no communication is exchanged with the second communication device 512.

In some embodiments, the transition to the third state may comprise a termination of an ongoing connection with the second communication device 512. The third state may therefore be for example, a standby state, or a connection state with another communication device in the communications network 500.

Action 602 will be further described below in relation to the examples of FIGS. 8 and 9.

To exemplify the foregoing, in some particular embodiments, the first communication device 511 and the second communication device 512 are each a BLE device, the message transmitted by the first communication device 511 to the second communication device 512 is a connection request message transmitted in response to a received advertising message, the first state is an initializing state and the second state is a connection state, the one or more transmissions are one or more advertising messages, the searching 601 for the one or more transmissions is performed on the BLE advertising frequencies, and the performing 602 one or more actions to resolve the state mismatch between the first communication device 511 and the second communication device 512 comprises one of: a) sending another connection request message and b) terminating the connection with the second communication device 512.

In other particular embodiments, the first communication device 511 and the second communication device 512 are each a BLE device, the message transmitted by the first communication device 511 to the second communication device 512 is a data transmission, the first state is an initializing state and the second state is a connection state, the one or more transmissions are one or more advertising messages, the searching 601 for the one or more transmissions is performed on the BLE advertising frequencies, and the performing 602 one or more actions to resolve the state mismatch between the first communication device 511 and the second communication device 512 comprises one of: a) sending another connection request message to the second communication device 512, and b) terminating the connection with the second communication device 512.

In yet some other particular embodiments, the first communication device 511 and the second communication device 512 are each a BLE device, the message transmitted by the first communication device 511 to the second communication device 512 is a response to a connection termination message, the first state is a connection state and the second state is a standby state, the one or more transmissions are one or more data messages, and the searching 504 for the one or more transmissions is performed on the BLE data frequencies, and the performing 505 one or more actions to resolve the state mismatch between the first communication device 511 and the second communication device 512 comprises responding to the detected one or more data transmissions from the second communication device 512.

An advantage of embodiments herein is that they provide means to quickly detect and resolve a state mismatch. Compared to the existing methods using a timeout, the expected state mismatch resolution time is significantly lower, although the exact advantage may depend on how the link may have been configured. That is, the time it may take to resolve the state mismatch using existing methods based on a timeout procedure depends on how the link may have been configured, e.g., the length of the connection interval. With a connection interval of e.g., 7.5 milliseconds (ms), the timeout may resolve the mismatch in 45 ms. With a connection interval of 4 seconds (s), the timeout may resolve the mismatch in 24 s.

For example, in BLE, during connection setup, embodiments herein may typically resolve the state mismatch within a few milliseconds, which should be compared to the resolution time of the existing methods, that is, anything between 45 ms to 24 s.

During connection termination, e.g., in BLE, embodiments herein may typically resolve the state mismatch within a time corresponding to one connection interval (connInterval), which may be compared to the timeout that is at least, e.g., (1+connSlaveLatency)*connInterval*2, i.e., a time that is at least two times higher but often at least 20 times higher.

While embodiments herein are described using terminology and particular examples in BLE, it will be understood that embodiments herein and their advantages, similarly apply to any other communication devices operating according to a state machine, such as e.g., peer devices in other short range radio technologies based on 802.15.4 derivatives such as Zigbee, WirelessHART, and ISA100.11a, also Z-wave, 802.11, 802.11ah, as well as e.g. communication devices operating according to a LTE UE RRC state machine, wherein the first state, the second state, and the third state may correspond to other names than those provided herein for BLE.

In some embodiments, the method performed by the first communication device 511 for performing one or more actions to resolve a state mismatch between the first communication device 511 and the second communication device 512, may comprise additional actions to those described in relation to FIG. 6. FIG. 7 depicts a flowchart of the actions that are or may be performed by the first communication device 511 in some embodiments herein. A dashed line depicts an optional action.

The following actions may as well be carried out in another suitable order than that described below. One or more embodiments may be combined, where applicable. In some embodiments, all actions may be performed. In other embodiments, only some actions may be performed.

Action 701

In order to conduct the search for the one or more transmissions without using unnecessary resources, in this action, the first communication device 511 may first determine a time and a frequency for searching 601 for the one or more transmissions from the second communication device 512 that are indicative of a state mismatch between the first communication device 511 and the second communication device 512. As an example of the time, the first communication device 511 may determine to search during 1 ms after the transmission of the connection request in BLE. Examples of the frequency are described below in the Section entitled "Scanning frequency selection according to Action 702".

In some embodiments, wherein the one or more transmissions are advertising transmissions, the determining 701 of the time may be based on a timing information for advertising transmissions comprised in a received advertisement message from the second communication device 512. That is, the first communication device 511 may learn about the timing for the advertising transmissions from the second communication device 512, from information received from the second communication device 512 itself. For example, the timing information may be that the next advertisement transmission is transmitted a number X of seconds after the end of the current advertisement transmission. An example of time may be 250 µs. In fact, the second communication device 512 may also send frequency information for the advertising transmissions from the second communication device 512 to the first communication device 511 in the same message, or in another message.

In other embodiments, the determining 701 of the time may be based on one or more assumptions. For example in BLE, the first communication device 511 may assume that the second communication device 512, the advertiser, cycles through the advertisement frequencies, e.g., 37, 38, 39. In another example, if an advertisement is received on frequency 37 or 38 the first communication device 511 may assume that the second communication device 512, the advertiser, tries to transmit the next message as soon as possible, which may be around 250 µs from the end of the previous one. If the advertisement is received on frequency 39, the initiator may assume that the next transmission will happen at the beginning of the next advertisement event, which may be, e.g., 100 ms in the future.

By performing this action, the first communication device 511 may avoid wasting resources, in searching for the transmission from the second communication device 512 at time points when, or in frequencies wherein, the second communication device 512 does not transmit.

Action 701 is an optional action.

Action 702

Once the first communication device 511 has determined the time and the frequency for searching 601 for the one or more transmissions from the second communication device 512, the first communication device 511 may select a frequency in the communication medium between the first communication device 511 and the second communication device 512 for searching 601 for the one or more transmissions from the second communication device 512.

The communication medium may be understood to refer to a range of radio frequencies.

The selecting 702 may be based on a frequency that an earlier message from the second communication device 512 was received on. For example in BLE, in some embodiments, the earlier message may be the received advertisement message from the second communication device 512, comprising the timing information and/or frequency information for advertising transmissions. However, in other embodiments, the earlier message from the second communication device 512, may be an earlier message that did not comprise this timing information. That is, in some embodiments, only one of Actions 701 and 702 may be performed. Action 702 is an optional action.

Based on the earlier message, the first communication device 511 may determine or deduct the frequency the second communication device 512 uses to transmit the one or more transmissions. By then selecting the frequency in the communication medium, the first communication device 511 may avoid wasting resources, in searching for the transmission from the second communication device 512 in frequencies wherein the second communication device 512 does not transmit.

Action 703

In some particular embodiments wherein the first communication device 511 is an initiator or a master device, the first communication device 511 may use information gained from earlier communications with the second communication device 512, to obtain, e.g., determine or receive, a probability of occurrence of the state mismatch between the first communication device 511 and the second communication device 512. Based on this probability or risk or occurrence of the state mismatch between the first communication device 511 and the second communication device 512, the first communication device 511 may then lengthen, if the probability is high, or shorten, if the probability is low, a time between a transmission of a connection request message to the second communication device 512 and transmission of a first data transmission to the second communication device 512. The first communication device 511 may do this to allow enough time to resolve of any state mismatch between the first communication device 511 and the second communication device 512, prior to attempting to send data to the second communication device 512, if for example, the risk of occurrence of a state mismatch is high.

Accordingly, in this action, in e.g., BLE, the first communication device 511 may determine a time between a transmission of a connection request message to the second communication device 512 and a transmission of a first data transmission to the second communication device 512. The determining 703 of the time between the transmission of the connection request message to the second communication device 512 and the transmission of the first data transmission to the second communication device 512 may be based on a probability of occurrence of a state mismatch between the first communication device 511 and the second communication device 512. The probability of occurrence of the state mismatch between the first communication device 511 and the second communication device 512 may have been determined by the first communication device 511 itself based on historical values collected during earlier communications with the second communication device 512, and collected statistics on occurrence of state mismatches between the first communication device 511 and the second communication device 512. The probability of occurrence of a state mismatch between the first communication device 511 and the second communication device 512 may be determined to be high or low, according to a configured criterion, e.g., a threshold.

In these embodiments, a time for the searching 601 for the one or more transmissions may be based on the determined time between the transmission of the connection request message and the transmission of the first data transmission.

Action 703 is an optional action.

Action 704

Action 704 corresponds to Action 601, and will therefore not be repeated here.

Action 705

Action 705 corresponds to Action 602, and will therefore not be repeated here.

The first communication device 511 may perform the method of FIG. 6 and/or FIG. 7 differently during connection setup than during connection termination, as described below in further detail for BLE embodiments.

State Mismatch Resolution During Connection Setup

Figure 8:
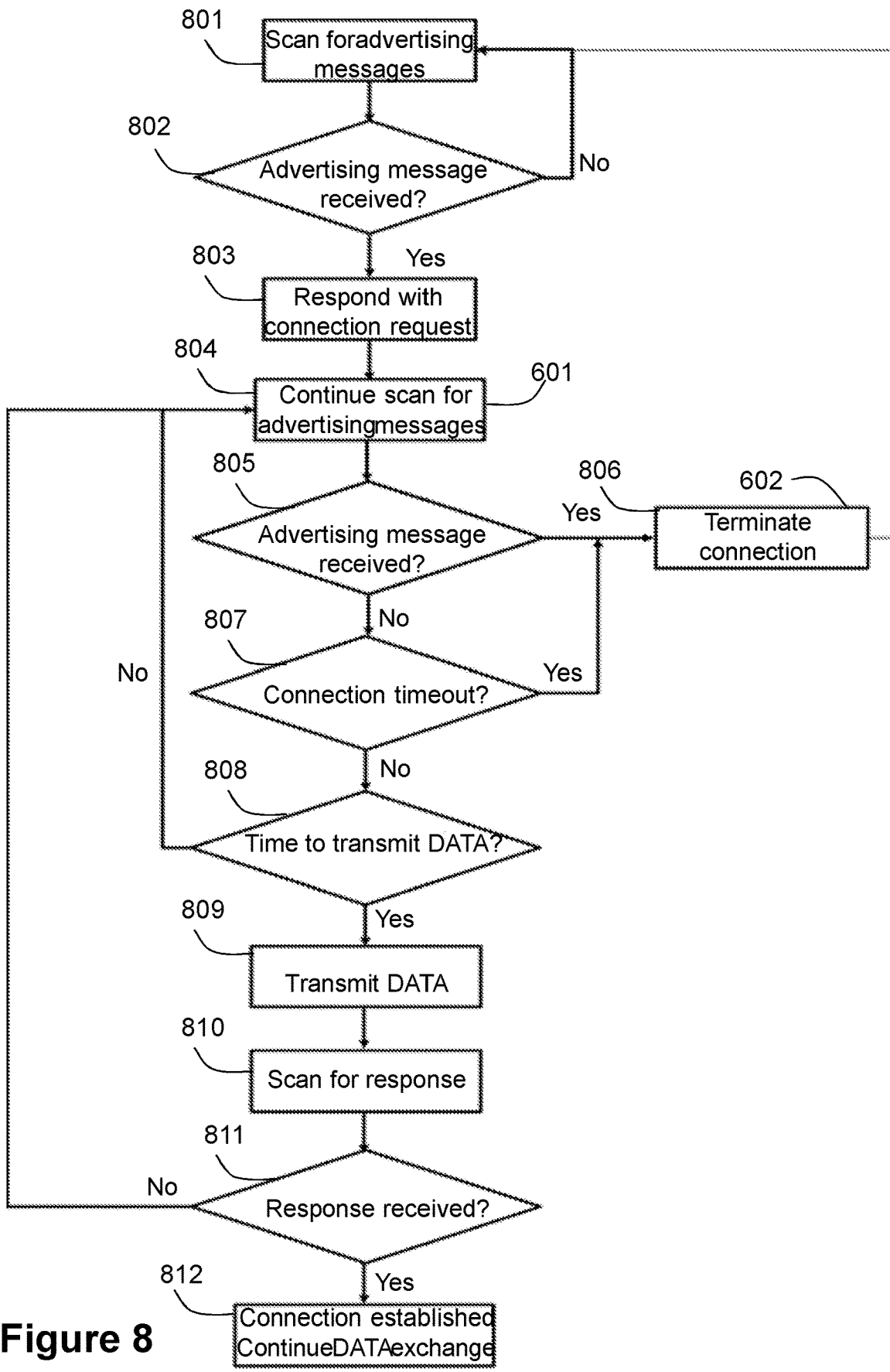
FIG. 8 is a schematic diagram illustrating embodiments of a method in a first communication device as an initiator/master, during a connection setup, according to some embodiments.

FIG. 8 is a schematic flowchart of a non-limiting example of a method in the first communication device 511 according to embodiments herein, concerning state mismatch resolution during connection setup. FIG. 8 illustrates the enhanced connection setup procedure, which may be performed by the first communication device 511 acting as initiator and later on taking on the role as master in the connection with the second communication device 512, the advertiser. In regards to FIG. 8 and the state mismatch resolution during connection setup, any reference to the initiator, the master or the master node, is understood to apply to the first communication device 511, and any reference to the advertiser is understood to apply to the second communication device 512. The first communication device 511 may scan for advertisement messages from the second communication device 512 in action 801, and determine if an advertisement message has been received in Action 802. When receiving an advertising message from the advertiser, the initiator may respond with a connection request message in Action 803. In this moment, the initiator may change state to connection state and take on the master role. Before sending the first data transmission, however, the master continues to scan the advertisement frequencies for advertisement messages from the same peer device, the second communication device 512, according to Action 601, represented as Action 804 in this Figure. In Action 805, the first communication device 511, determines if an advertisement message has been received. If such a message is discovered, the master may conclude that a state mismatch has occurred and may terminate the connection, according to Action 602, Action 806 in this Figure.

If no additional advertising message is received, in Action 807, the first communication device 511 determines if a connection timeout has occurred. If it has not, in Action 808, the first communication device 511 determines whether it is time to transmit data to the second communication device 512, as determined by the connection interval. If it is time, in Action 809, the master may initiate the data exchange by transmitting a packet to the peer device, and scan for a response of this data transmission in Action 810. In Action 811, the first communication device 511, determines if a response has been received. A response may indicate that the setup procedure was successfully completed and the connection is established in Action 812. If no response is received, however, a state mismatch may have occurred and the master may go back to Action 804 and scan the advertising frequencies for an advertising message from the peer device. If such an advertisement message is discovered, the master may terminate the connection as in Action 806. If not, this procedure may continue until the connection is either established in Action 812 or is terminated due to a timeout in Action 807.

Alternatively, instead of going back to initiating state, when the state mismatch is discovered, the master may directly respond to the advertisement message with a new connection request message, making yet another attempt to successfully create the connection.

Scanning Frequency Selection According to Action 702

In BLE, as depicted in FIG. 2, there may be three advertisement frequencies, link layer channel 37, 38, and 39, and all advertisement messages may be repeated over all three frequencies. The period over which the messages may be repeated is called the advertising interval, and the first transmission within the interval may use the link layer frequency 37 and all the advertisement frequencies may be used within the advertisement interval. Most BLE devices, however, may only be equipped with a single radio and may hence only transmit or receive at a frequency at the time.

Accordingly, in some embodiments herein performing Action 702, the first communication device 511, as the master node, after transmitting the connection request message, may select a scanning frequency as a function of the frequency that the initial advertisement message was received on, from the second communication device 512.

Let CH define a row vector of size 1×N comprising the N available advertising frequencies, e.g., CH=[37, 38, 39]. Let further $ch_{adv}$ define the frequency on which the advertising message was received on, and $i_{adv}$ the corresponding index to the vector CH, such that:

$$ch_{adv}=CH(i_{adv})$$

where $i_{adv}=1,2,\ldots,N$. Similarly, denote by c/scan the frequency on which the master may scan and $i_{scan}$ be the corresponding index, $i_{scan}=1,2\ldots,N$:

$$ch_{scan}=CH(i_{scan})$$

The frequency scanning index, $i_{scan}$, and the scanning frequency, $ch_{scan}$, may then be determined as:

$$i_{scan}=\mathrm{mod}(i_{adv}+k-1,N)+1$$

$$ch_{scan}=CH(i_{scan})$$

where k is an integer in the range [1, . . . , N−1].

Hence, in an example with CH=[37, 38, 39], and assuming that the advertising message is received on frequency 37 the master may scan on frequency 38 or 39. Compared to staying on frequency 37, this improves the probability of detecting the state mismatch, as the master may assume that the advertiser will switch from frequency 37 to 38 and later 39.

Timing of the First Data Transmission According to Action 703

According to Action 703, the first communication device 511, as master device, may, within some limits, decide at what moment in time the first data transmission takes place. This flexibility may be used to maximize the probability that a state mismatch is discovered before initializing the data transmission. The time between the transmission of the connection request and the time of the first data transmission may be at least 1.25 ms, but not exceed 1.25 ms+connInterval. In situations when the risk of a state mismatch is high, the master may decide to use a relatively long delay between the transmission of the connection request message and the first data transmission, in order to have sufficient time for scanning and discover a potential state mismatch. The probability of a state mismatch may be high when, e.g., the signal quality is low or when many devices contend for resources on the contention-based advertisement frequencies. Low signal quality may be estimated from, e.g., the Received Signal Strength Indicator (RSSI) of the received advertisement message, and may imply a high packet error probability. As the frequency is reciprocal, the RSSI of the advertisement message, received by the initiator, may be correlated with the RSSI, and hence the packet error rate, of the connection request message received by the advertiser. The risk of contention may be estimated, e.g., by monitoring the activity on the advertisement frequencies.

In some embodiments, the first communication device 511, as master initiating node, may determine the time between the transmission request message and the first data transmission based on the risk of the occurrence of a state mismatch.

Deterministic Advertising Times According to Action 701

At the initiator side, the time in between two advertisement transmissions from the second communication device 512 is unknown in the general case. The time in between two advertisement transmissions from the second communication device 512 may depend on, e.g., the advertisement interval, the distribution of the advertisement transmission within the advertisement interval, and the pseudo random time delay between two advertising intervals. The timing is known to the advertiser, the second communication device 512, however, and the second communication device 512 may include timing and frequency information about the next advertisement transmission in the current advertisement message. This information may help the initiator to set up the scanning and the timing of the first data transmission.

According to Action 701, in some embodiments, which may be based on any or both of the embodiments described above under the subheader "Scanning frequency selection according to Action 702" and under the subheader "Timing of the first data transmission according to Action 703", respectively, the initiator may extract the timing of the next advertising transmission from the received advertisement message, and determine scanning timing and scanning frequency, as well as timing of the first data transmission as a function of the timing of the next advertisement transmission.

State Mismatch Resolution During Connection Termination

Figure 9:
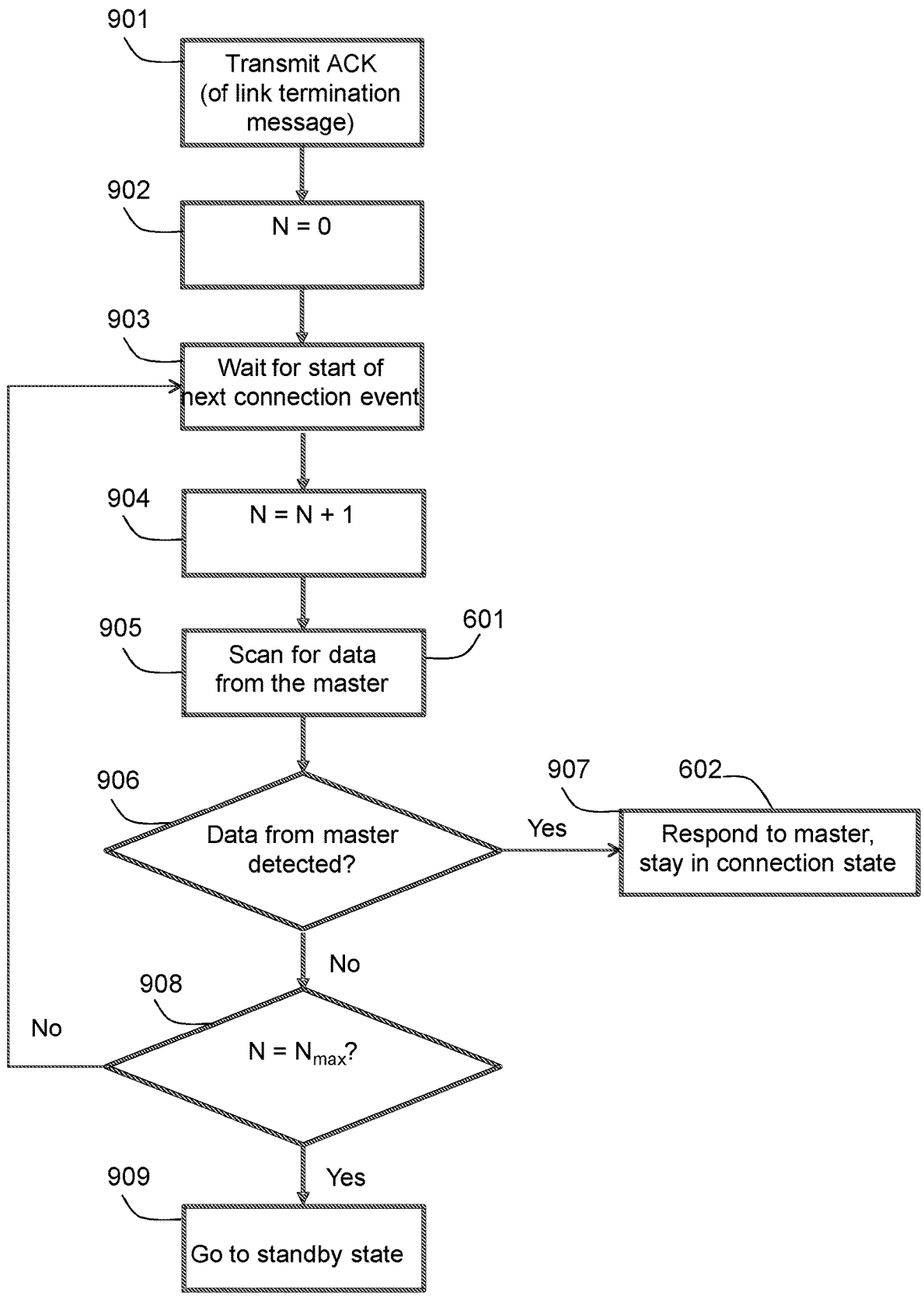
FIG. 9 is a schematic diagram illustrating embodiments of a method in a first communication device as a slave, during a connection termination, according to some embodiments.

FIG. 9 is a schematic flowchart of a non-limiting example of a method in the first communication device 511 according to embodiments herein, concerning state mismatch resolution during connection termination. FIG. 9 illustrates an enhanced connection termination procedure, as performed by the first communication device 511 as slave, and given that the second communication device 512, as master, is the device that may have transmitted the connection termination message, which may also be referred to as the link layer connection termination command. In regards to FIG. 9 and the state mismatch resolution during connection termination, any reference to the slave is understood to apply to the first communication device 511, and any reference to the master is understood to apply to the second communication device 512. The slave may start by, in Action 901, transmitting the acknowledgement of the termination message, but instead of directly going to standby state, in Action 902, the first communication device 511 may start a connection interval counter N, and wait for the start of the next connection event or interval in Action 903. In Action 904, at the end of the first connection interval, the connection interval counter may add one. In Action 905, the first communication device 511 may scan the data frequencies for any transmission from the master for a time corresponding to $N_{max}$ connection intervals. If a message from the master is detected in Action 906, the slave may resolve the situation by responding to this message in Action 907, which is equivalent to Action 602. If no message from the master is detected in Action 908, after $N_{max}$ connection events, the slave may assume that the connection has been successfully terminated also at the master side and may go to standby mode in Action 909. A preferred value of $N_{max}$ may be one (1) or two (2).

To summarize all of the above, the embodiments herein provide for a method for state mismatch resolution, in which the first communication device 511 searches for indications of a state mismatch between itself and its communication peer, the second communication device 512, and may autonomously act to resolve the mismatch. The state mismatch may be discovered by monitoring the activity of the peer device on the communication medium, and any detected activity that is inconsistent with the assumed state of the peer may trigger the state mismatch resolution mechanism. The state mismatch may be resolved by entering a state which matches the estimated state of the peer device.

During connection setup in, e.g., a BLE network, the state mismatch resolution may be used by the first communication device 511, as master node, that has created, but not established, a connection with a peer device, the second communication device 512. A detected advertisement packet from the peer device may trigger the resolution, which may be realized by terminating the created connection and moving back to initializing state.

Similarly, the state mismatch resolution may be used by the first communication device 511, as a slave device, in, e.g., a BLE network, during connection termination. After acknowledging the termination message, the first communication device 511 may continue to scan for data messages from the master. If a message from the master is detected, the slave may resolve the mismatch by responding to the connection.

Examples of embodiments herein may relate to a method performed by the first communication device 511 in the communications network 500 that, upon the transmission of an unacknowledged message to the communication peer device, which message should cause a state transition of the communicating peer, may actively initialize a search for transmissions on the communication medium from the communication peer that are inconsistent with the assumed new state of the peer. Upon detection of such a transmission, the first communication device 511 may conclude that the peer state transition was unsuccessful and that a state mismatch occurred. Based on such a state mismatch detection, the first communication device 511 may autonomously take action to move to a state consistent with the state of the peer device.

In a further particular example, the first communication device 511 is a BLE device in initiator state, the unacknowledged message is a connection request message, sent in response to a received advertising message, and the first communication device 511 moves to connection state when the connection request message has been transmitted. After moving to connection state, the first communication device 511 initiates a search on the BLE advertising frequencies for advertising messages from the peer device. Upon detection of such an advertising message, the first communication device 511 concludes that the peer did not enter connection state and that a state mismatch occurred. Based on such a state mismatch, the first communication device 511 moves back to initializing state.

In yet a further particular example, the first communication device 511 is a BLE device in connection state acting as a slave. The unacknowledged message is a response to a connection termination message, the first communication device 511 moves from connection state to standby state when the message has been transmitted. After moving to standby state, the first communication device 511 actively monitors the data frequencies associated with the terminated connection for messages from the peer device. Upon detection of such a data message, the first communication device 511 concludes that the peer device did not leave the connection state and that a state mismatch occurred. Based on such a state mismatch, the first communication device 511 resolves the state mismatch by moving back to the connection state and responds to the data message from the peer.

Figure 10:
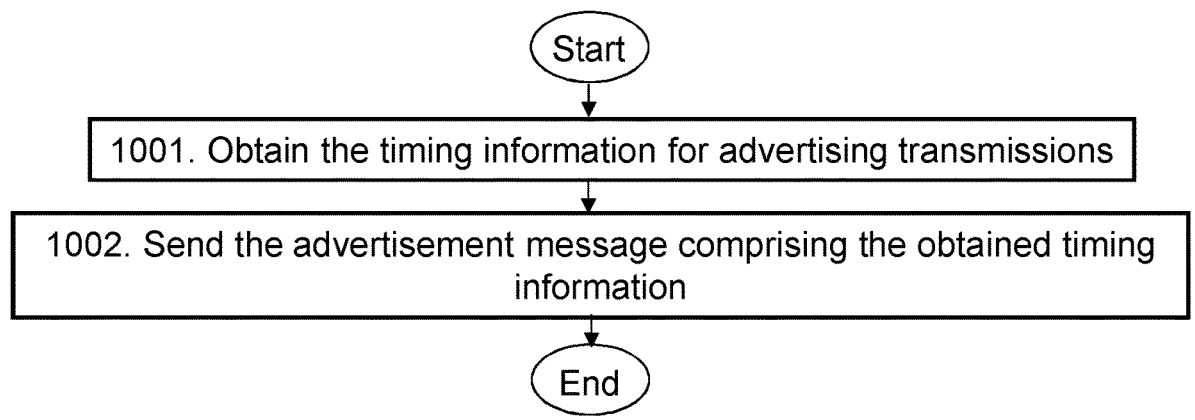
FIG. 10 is a schematic diagram illustrating embodiments of a method in a second communication device, according to some embodiments.

Embodiments of a method performed by the second communication device 512 for sending the advertisement message to the first communication device 511, will now be described with reference to the flowchart depicted depicted in FIG. 10. As stated earlier, the first communication device 511, and the second communication device 512, operate in the communications network 500. FIG. 10 depicts a flowchart of the actions that are performed by the second communication device 512 in embodiments herein.

The method comprises the following actions. One or more embodiments may be combined, where applicable. All possible combinations are not described to simplify the description. The detailed description of some of the following corresponds to the same references provided above, in relation to the actions described for the first communication device 511, and will thus not be repeated here.

As stated earlier, in some embodiments, the first communication device 511 and the second communication device 512 are each a BLE device.

Action 1001

In order to provide the timing information to the first communication device 511 that may then enable it to perform Action 701, in this action, the second communication device 512 first obtains the timing information for advertising transmissions. The timing information comprises a time of transmission of the one or more transmissions from the second communication device 512 on the communication medium between the first communication device 511 and the second communication device 512. The one or more transmissions are one or more advertisement messages.

The second communication device 512 may obtain the timing information from predetermined information stored in the device, by receiving the information, or by determining the information itself through an algorithm.

The timing information refers to that described in Action 701.

Action 1002

In this action, the second communication device 512 sends the advertisement message to the first communication device 511, e.g., in one of the advertisement frequencies described earlier. The message comprises the obtained timing information for advertising transmissions. The advertisement message enables the first communication device 511 to determine, as described in Action 701, the time for searching for the one or more transmissions from the second communication device 512 that are indicative of the state mismatch between the first communication device 511 and the second communication device 512.

To perform the method actions described above in relation to FIGS. 6-9, the first communication device 511 is configured to perform the one or more actions to resolve the state mismatch between the first communication device 511 and the second communication device 512. The first communication device 511 may comprise the following arrangement depicted in FIG. 11. As already mentioned, the first communication device 511 and the second communication device 512 are configured to operate in the communications network 500.

The detailed description of some of the following corresponds to the same references provided above, in relation to the actions described for the first communication device 511, and will thus not be repeated here.

The first communication device 511 is further configured to, e.g., by means of an searching module 1101 configured to, search for the one or more transmissions from the second communication device 512 that are indicative of the state mismatch between the first communication device 511 and the second communication device 512.

The searching module 1101 may be a processor 1106 of the first communication device 511.

The first communication device 511 is further configured to, e.g., by means of a performing module 1102 configured to, upon detection of the one or more transmissions, perform the one or more actions to resolve the state mismatch, the performing of the one or more actions being configured to be according to one of: a) the current state of the second communication device 512 and b) the transition to a state different from the current state of the first communication device 511.

The performing module 1102 may be the processor 1106 of the first communication device 511.

In some embodiments, the transition to the third state may comprise the termination of the connection configured to be ongoing with the second communication device 512.

In some embodiments, the first communication device 511 and the second communication device 512 are each a BLE device; the message is the connection request message configured to be transmitted in response to the received advertising message; the first state is the initializing state and the second state is the connection state; the one or more transmissions are the one or more advertising messages, and to search for the one or more transmissions is configured to be performed on the BLE advertising frequencies; and to perform the one or more actions to resolve the state mismatch between the first communication device 511 and the second communication device 512 may comprise one of: a) to send another connection request message and b) to terminate the connection with the second communication device 512.

In some embodiments, the first communication device 511 and the second communication device 512 are each a BLE device; the message is a data transmission, wherein the first state is an initializing state and the second state is a connection state; the one or more transmissions are the one or more advertising messages; to search for the one or more transmissions is configured to be performed on the BLE advertising frequencies; and to perform the one or more actions to resolve the state mismatch between the first communication device 511 and the second communication device 512 comprises one of: a) to send another connection request message to the second communication device 512, and b) to terminate the connection with the second communication device 512.

In some embodiments, the first communication device 511 and the second communication device 512 are each a BLE, device; the message is the response to the connection termination message; the first state is the connection state and the second state is the standby state; the one or more transmissions are the one or more data messages; to search for the one or more transmissions is performed on the BLE data frequencies; and to perform the one or more actions to resolve the state mismatch between the first communication device 511 and the second communication device 512 comprises to respond to the detected one or more data transmissions from the second communication device 512.

The first communication device 511 may be further configured to, e.g., by means of a selecting module 1103 configured to, select the frequency in the communication medium between the first communication device 511 and the second communication device 512 to search for the one or more transmissions from the second communication device 512, the selecting being based on the frequency that the earlier message from the second communication device 512 was received on.

The selecting module 1103 may be the processor 1106 of the first communication device 511.

In some embodiments, the first communication device 511 may be further configured to, e.g., by means of a determining module 1104 configured to, determine the time between the transmission of the connection request message to the second communication device 512 and the transmission of the first data transmission to the second communication device 512, wherein to determine the time between the transmission of the connection request message to the second communication device 512 and the transmission of the first data transmission to the second communication device 512 is based on a probability of occurrence of the state mismatch between the first communication device 511 and the second communication device 512, and wherein the time to search for the one or more transmissions is configured to be based on the determined time between the transmission of the connection request message and the transmission of the first data transmission.

The determining module 1104 may be the processor 1106 of the first communication device 511.

In some embodiments, the first communication device 511 may be further configured to, e.g., by means of the determining module 1104 configured to, determine the time and the frequency to search for the one or more transmissions from the second communication device 512 that are indicative of the state mismatch between the first communication device 511 and the second communication device 512, the determining of the time being configured to be based on the timing information for advertising transmissions comprised in the received advertisement message from the second communication device 512.

In some embodiments, the first communication device 511 may be further configured to, e.g., by means of a transmitting module 1105 configured to, transmit, prior to the search, the message to the second communication device 512, the message being associated with the second state in the first communication device 511 and the second state in the second communication device 512, and wherein:

a) the current state of the second communication device 512 is the earlier state to the second state; and b) the state different from the current state of the first communication device 511 is the third state, wherein no communication is configured to be exchanged with the second communication device 512.

The transmitting module 1105 may be the processor 1106 of the first communication device 511.

Figure 11:
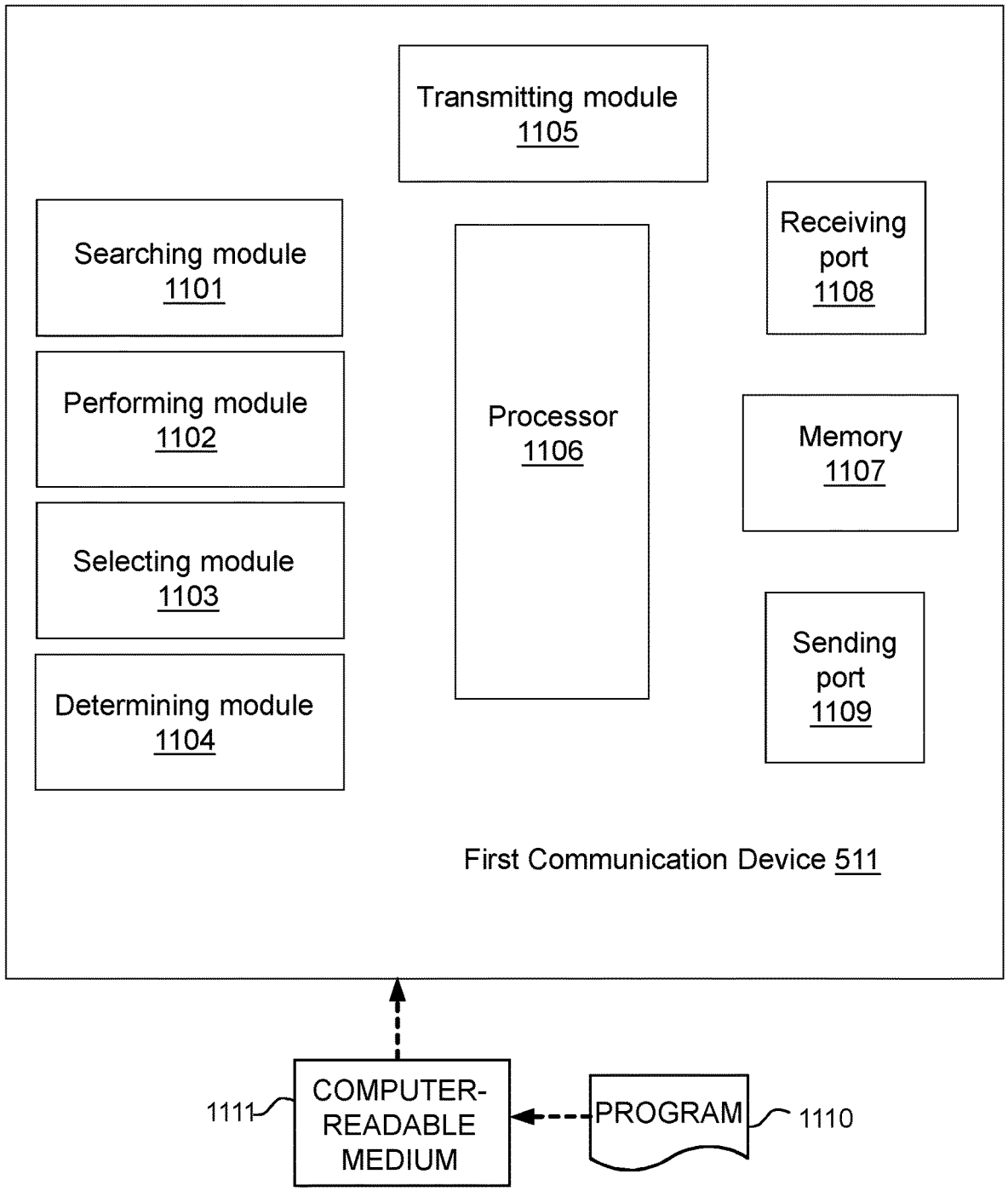
FIG. 11 is a schematic block diagram illustrating embodiments of a first communication device, according to embodiments herein.

The embodiments herein for performing the one or more actions to resolve the state mismatch between the first communication device 511 and the second communication device 512 may be implemented through one or more processors, such as the processor 1106 in the first communication device 511 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the first communication device 511. One such carrier may be in the form of a CD ROM disc. It is however feasible with other data carriers such as a memory stick. The computer program code may furthermore be provided as pure program code on a server and downloaded to the first communication device 511. As indicated above, the processor 1106 may comprise one or more circuits, which may also be referred to as one or more modules in some embodiments, each configured to perform the actions carried out by the first communication device 511, as described above in reference to FIGS. 5-8, e.g., the searching module 1101, the performing module 1102, the selecting module 1103, the determining module 1104, and the transmitting module 1105. Hence, in some embodiments, the searching module 1101, the performing module 1102, the selecting module 1103, the determining module 1104, and the transmitting module 1105 described above may be implemented as one or more applications running on one or more processors such as the processor 1106. That is, the methods according to the embodiments described herein for the first communication device 511 may be respectively implemented by means of a computer program product 1110, comprising instructions, i.e., software code portions, which, when executed on at least one processor 1106, cause the at least one processor 1106 to carry out the actions described herein, as performed by the first communication device 511. The computer program product may be stored on a computer-readable storage medium. The computer-readable storage medium 1111, having stored thereon the computer program, may comprise instructions which, when executed on at least one processor 1106, cause the at least one processor 1106 to carry out the actions described herein, as performed by the first communication device 511. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The first communication device 511 may further comprise a memory 1107 comprising one or more memory units. The memory 1107 may be arranged to be used to store obtained information, such as the information received by the processor 1106, store data configurations, schedulings, and applications etc. to perform the methods herein when being executed in the first communication device 511. The memory 1107 may be in communication with the processor 1106. Any of the other information processed by the processor 1106 may also be stored in the memory 1107.

In some embodiments, information e.g., from the second communication device 512, may be received through a receiving port 1108. The receiving port 1108 may be in communication with the processor 1106. The receiving port 1108 may also be configured to receive other information.

The processor 1106 may be further configured to send messages, e.g., to the second communication device 512, through a sending port 1109, which may be in communication with the processor 1106, and the memory 1107.

Those skilled in the art will also appreciate that the any module within the first communication device 511, e.g., the searching module 1101, the performing module 1102, the selecting module 1103, the determining module 1104, and the transmitting module 1105 described above, may refer to a combination of analog and digital circuits, and/or one or more processors configured with software and/or firmware, e.g. stored in the memory, that when executed by the one or more processors such as the processor 1106, perform actions as described above, in relation to FIGS. 6-9. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

To perform the method actions described above in relation to FIG. 10, the second communication device 512 is configured to send the advertisement message to the first communication device 511. The second communication device 512 may comprise the following arrangement depicted in FIG. 12. As already mentioned, the first communication device 511, and the second communication device 512 are configured to operate in the communications network 500.

The detailed description of some of the following corresponds to the same references provided above, in relation to the actions described for the second communication device 512 and the first communication device 511, and will thus not be repeated here.

For example, in some embodiments, each of the second communication device 512 and the first communication device 511 is a BLE device.

The second communication device 512 is further configured to, e.g., by means of an obtaining module 1201 configured to, obtain the timing information for the advertising transmissions, the timing information comprising the time of transmission of one or more transmissions from the second communication device 512 on the communication medium between the first communication device 511 and the second communication device 512, the one or more transmissions being one or more advertisement messages.

The obtaining module 1201 may be a processor 1203 of the second communication device 512.

The second communication device 512 may be further configured to, e.g., by means of a sending module 1202 configured to, send the advertisement message to the first communication device 511, the message comprising the obtained timing information for advertising transmissions, wherein the advertisement message is configured to enable the first communication device 511 to determine a time for searching for the one or more transmissions from the second communication device 512 that are indicative of a state mismatch between the first communication device 511 and the second communication device 512.

The sending module 1202 may be the processor 1203 of the second communication device 512.

Figure 12:
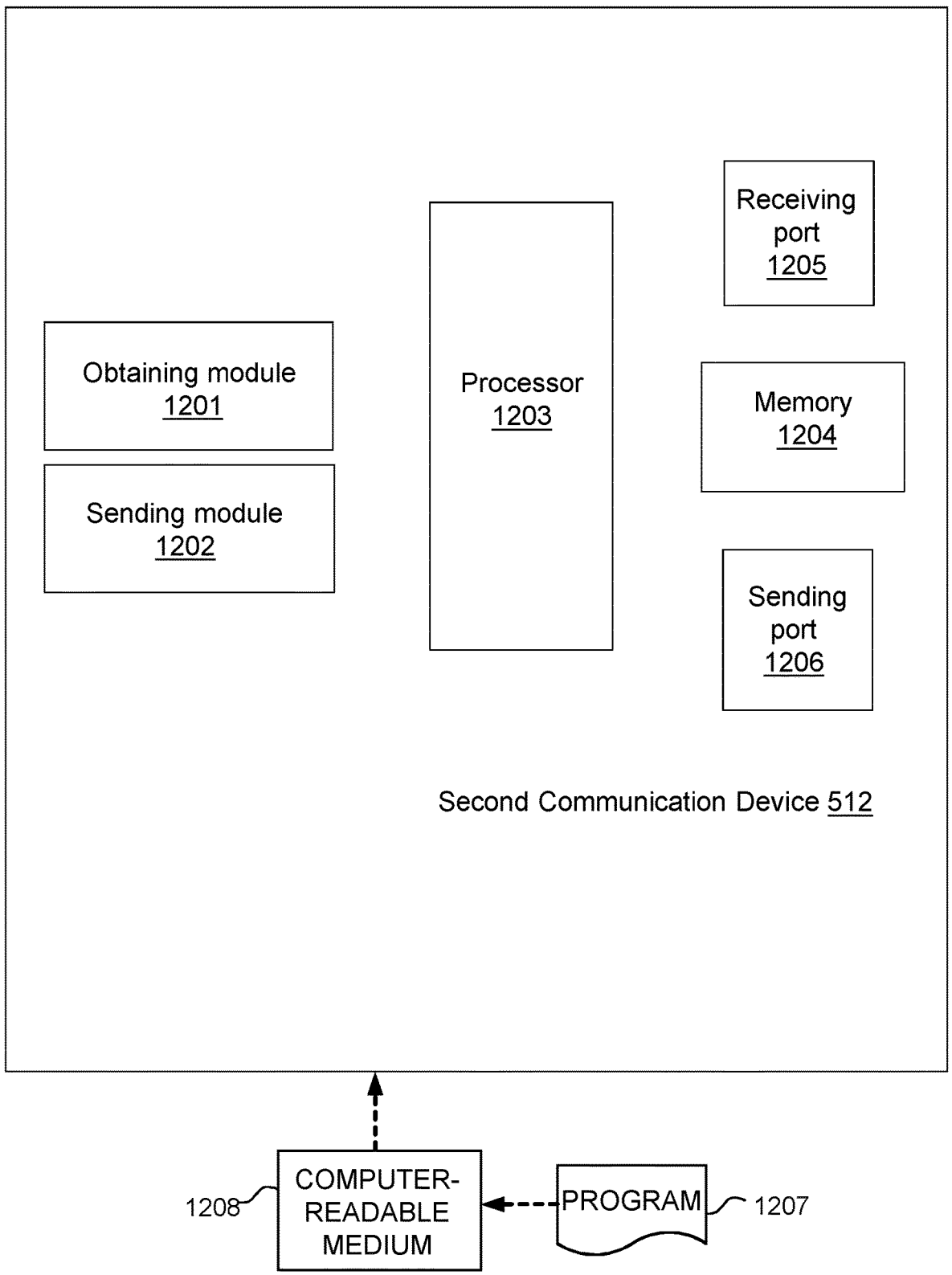
FIG. 12 is a schematic block diagram illustrating embodiments of a second communication device, according to embodiments herein.

The embodiments herein for sending the advertisement message to the first communication device 511 may be implemented through one or more processors, such as the processor 1203 in the second communication device 512 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the in the second communication device 512. One such carrier may be in the form of a CD ROM disc. It is however feasible with other data carriers such as a memory stick. The computer program code may furthermore be provided as pure program code on a server and downloaded to the second communication device 512. As indicated above, the processor 1203 may comprise one or more circuits, which may also be referred to as one or more modules in some embodiments, each configured to perform the actions carried out by the second communication device 512, as described above in reference to FIG. 10, e.g., the obtaining module 1201, and the sending module 1202. Hence, in some embodiments, the obtaining module 1201, and the sending module 1202 described above may be implemented as one or more applications running on one or more processors such as the processor 1203. That is, the methods according to the embodiments described herein for the second communication device 512 may be respectively implemented by means of a computer program 1207 product, comprising instructions, i.e., software code portions, which, when executed on at least one processor 1203, cause the at least one processor 1203 to carry out the actions described herein, as performed by the second communication device 512. The computer program product may be stored on a computer-readable storage medium. The computer-readable storage medium 1208, having stored thereon the computer program, may comprise instructions which, when executed on at least one processor 1203, cause the at least one processor 1203 to carry out the actions described herein, as performed by the second communication device 512. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The second communication device 512 may further comprise a memory 1204 comprising one or more memory units. The memory 1204 may be arranged to be used to store obtained information, such as the information received by the processor 1203, store data configurations, schedulings, and applications etc. to perform the methods herein when being executed in the second communication device 512. Memory 1204 may be in communication with the processor 1203. Any of the other information processed by the processor 1203 may also be stored in the memory 1204.

In some embodiments, information e.g., from the first communication device 511, may be received through a receiving port 1205. The receiving port 1205 may be in communication with the processor 1203. The receiving port 1205 may also be configured to receive other information.

The processor 1203 may be further configured to send messages, e.g., to the first communication device 511, through a receiving port 1206, which may be in communication with the processor 1203, and the memory 1204.

Those skilled in the art will also appreciate that the any module within the second communication device 512, e.g., obtaining module 1201, and the sending module 1202 described above, may refer to a combination of analog and digital circuits, and/or one or more processors configured with software and/or firmware, e.g. stored in the memory, that when executed by the one or more processors such as the processor 1203, perform actions as described above, in relation to FIG. 10. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a first communication device for performing one or more actions to resolve a state mismatch between the first communication device and a second communication device operating in a communications network, the method comprising:
   transmitting a message to the second communication device, the message being associated with a subsequent state to a current state of the first communication device and a subsequent state to a current state of the second communication device,
   upon transmitting the message, searching for one or more transmissions from the second communication device that are indicative of the state mismatch between the first communication device and the second communication device, wherein a time for the searching for the one or more transmissions is based on a time between transmission of a connection request message and transmission of a first data transmission to the second communication device, and
   upon detection of the one or more transmissions,
   performing the one or more actions to resolve the state mismatch, the performing of the one or more actions being according to one of:
   a) the current state of the second communication device, and
   b) a transition to a state different from the current state of the first communication device.

2. The method of claim 1, wherein:
   a) the current state of the second communication device is a first state;
   b) the subsequent state of the first communication device is a second state of the first communication device and the subsequent state of the second communication device is a second state of the second communication device; and
   c) the state different from the current state of the first communication device is a third state, wherein no communication is exchanged with the second communication device.

3. The method of claim 2, wherein the transition to the third state comprises a termination of an ongoing connection with the second communication device.

4. The method of claim 2, wherein each of the first communication device and the second communication device is a Bluetooth Low Energy (BLE) device, wherein the message is a connection request message transmitted in response to a received advertising message, wherein the first state is an initializing state and the second state is a connection state, wherein the one or more transmissions are one or more advertising messages, wherein the searching for the one or more transmissions is performed on BLE advertising frequencies, and wherein the performing the one or more actions to resolve the state mismatch between the first communication device and the second communication device comprises one of: a) sending another connection request message, and b) terminating a connection with the second communication device.

5. The method of claim 2, wherein each of the first communication device and the second communication device is a Bluetooth Low Energy (BLE) device, wherein the message is a data transmission, wherein the first state is an initializing state and the second state is a connection state, wherein the one or more transmissions are one or more advertising messages, wherein the searching for the one or more transmissions is performed on BLE advertising frequencies, and wherein the performing the one or more actions to resolve the state mismatch between the first communication device and the second communication device comprises one of: a) sending another connection request message to the second communication device, and b) terminating a connection with the second communication device.

6. The method of claim 2, wherein each of the first communication device and the second communication device is a Bluetooth Low Energy (BLE) device, wherein the message is a response to a connection termination message, wherein the first state is a connection state and the second state is a standby state, wherein the one or more transmissions are one or more data messages, wherein the searching for the one or more transmissions is performed on BLE data frequencies, and wherein the performing the one or more actions to resolve the state mismatch between the first communication device and the second communication device comprises responding to the detected one or more data transmissions from the second communication device.

7. The method of claim 1, the method further comprising:
   selecting a frequency in a communication medium between the first communication device and the second communication device for searching for the one or more transmissions from the second communication device, the selecting being based on a frequency that an earlier message from the second communication device was received on.

8. The method of claim 1, the method further comprising:
   determining the time between the transmission of the connection request message to the second communication device and the transmission of the first data transmission to the second communication device, wherein the determining of the time between the transmission of the connection request message to the second communication device and the transmission of the first data transmission to the second communication device is based on a probability of occurrence of the state mismatch between the first communication device and the second communication device.

9. The method of claim 1, the method further comprising: determining the time and a frequency for searching for the one or more transmissions from the second communication device that are indicative of the state mismatch between the first communication device and the second communication device, the determining of the time being further based on timing information for advertising transmissions comprised in an advertisement message received from the second communication device.

10. A non-transitory computer-readable storage medium, having stored thereon a computer program, comprising instructions which, when executed on at least one processor, cause the at least one processor to carry out the method according to claim 1.

11. A method performed by a second communication device for sending an advertisement message to a first communication device, the first communication device and the second communication device operating in a communications network, the method comprising:
obtaining timing information for one or more transmissions, the timing information comprising a time of transmission of the one or more transmissions from the second communication device on a communication medium between the first communication device and the second communication device, the one or more transmissions being one or more advertisement messages, and
sending an advertisement message, of the one or more advertisement messages, to the first communication device, the advertisement message comprising frequency information and the obtained timing information for a next advertisement message, of the one or more advertisement messages, to be sent to the first communication device, wherein the advertisement message enables the first communication device to determine the frequency information and the timing information for the next advertisement message from the second communication device that are indicative of a state mismatch between the first communication device and the second communication device.

12. A non-transitory computer-readable storage medium, having stored thereon a computer program, comprising instructions which, when executed on at least one processor, cause the at least one processor to carry out the method according to claim 11.

13. A first communication device configured to perform one or more actions to resolve a state mismatch between the first communication device and a second communication device configured to operate in a communications network, the first communication device being further configured to:
transmit a message to the second communication device, the message being associated with a subsequent state to a current state of the first communication device and a subsequent state to a current state of the second communication device,
upon the transmission of the message, search for one or more transmissions from the second communication device that are indicative of the state mismatch between the first communication device and the second communication device, wherein a time to search for the one or more transmissions is configured to be based on a time between transmission of a connection request message and transmission of a first data transmission to the second communication device, and
upon detection of the one or more transmissions, perform the one or more actions to resolve the state mismatch, the performing of the one or more actions being configured to be according to one of:
a) the current state of the second communication device, and
b) a transition to a state different from the current state of the first communication device.

14. The first communication device of claim 13, wherein:
a) the current state of the second communication device is a first state;
b) the subsequent state of the first communication device is a second state of the first communication device and the subsequent state of the second communication device is a second state of the second communication device; and
c) the state different from the current state of the first communication device is a third state, wherein no communication is configured to be exchanged with the second communication device.

15. The first communication device of claim 14, wherein the transition to the third state comprises a termination of a connection configured to be ongoing with the second communication device.

16. The first communication device of claim 14, wherein each of the first communication device and the second communication device is a Bluetooth Low Energy (BLE) device, wherein the message is a connection request message configured to be transmitted in response to a received advertising message, wherein the first state is an initializing state and the second state is a connection state, wherein the one or more transmissions are one or more advertising messages, wherein the search for the one or more transmissions is configured to be performed on BLE advertising frequencies, and wherein, to perform the one or more actions to resolve the state mismatch between the first communication device and the second communication device, the first communication device is configured:
a) to send another connection request message, or
b) to terminate a connection with the second communication device.

17. The first communication device of claim 14, wherein each of the first communication device and the second communication device is a Bluetooth Low Energy (BLE) device, wherein the message is a data transmission, wherein the first state is an initializing state and the second state is a connection state, wherein the one or more transmissions are one or more advertising messages, wherein the search for the one or more transmissions is configured to be performed on BLE advertising frequencies, and wherein, to perform the one or more actions to resolve the state mismatch between the first communication device and the second communication device, the first communication device is configured: a) to send another connection request message to the second communication device, or b) to terminate a connection with the second communication device.

18. The first communication device of claim 14, wherein each of the first communication device and the second communication device is a Bluetooth Low Energy (BLE) device, wherein the message is a response to a connection termination message, wherein the first state is a connection state and the second state is a standby state, wherein the one or more transmissions are one or more data messages, wherein the search for the one or more transmissions is performed on BLE data frequencies, and wherein, to perform the one or more actions to resolve the state mismatch between the first communication device and the second communication device, the first communication device is configured to respond to the detected one or more data transmissions from the second communication device.

19. The first communication device of claim 13, the first communication device being further configured to:
select a frequency in a communication medium between the first communication device and the second communication device to search for the one or more transmissions from the second communication device, the selection being based on a frequency that an earlier message from the second communication device was received on.

20. The first communication device of claim 13, the first communication device being further configured to:
determine the time between the transmission of the connection request message to the second communication device and the transmission of the first data transmission to the second communication device, wherein to determine the time between the transmission of the connection request message to the second communication device and the transmission of the first data transmission to the second communication device is based on a probability of occurrence of the state mismatch between the first communication device and the second communication device.

21. The first communication device of claim 13, the first communication device being further configured to:
determine the time and a frequency to search for the one or more transmissions from the second communication device that are indicative of the state mismatch between the first communication device and the second communication device, the determining of the time being configured to be further based on timing information for advertising transmissions comprised in an advertisement message received from the second communication device.

22. A second communication device configured to send an advertisement message to a first communication device, the first communication device and the second communication device being configured to operate in a communications network, the first communication device being further configured to:
obtain timing information for one or more transmissions, the timing information comprising a time of transmission of the one or more transmissions from the second communication device on a communication medium between the first communication device and the second communication device, the one or more transmissions being one or more advertisement messages, and
send an advertisement message, of the one or more advertisement messages, to the first communication device, the advertisement message comprising frequency information and the obtained timing information for a next advertisement message, of the one or more advertisement messages, to be sent to the first communication device, wherein the advertisement message enables the first communication device to determine the frequency information and the timing information for the next advertisement message from the second communication device that are indicative of a state mismatch between the first communication device and the second communication device.

23. The second communication device of claim 22, wherein each of the second communication device and the first communication device is a Bluetooth Low Energy (BLE) device.

* * * * *